(12) United States Patent
Shimozawa et al.

(10) Patent No.: US 11,979,231 B2
(45) Date of Patent: May 7, 2024

(54) CONVERSION APPARATUS, CONVERSION METHOD, AND RECORDING MEDIUM

(71) Applicant: HITACHI SOLUTIONS, LTD., Tokyo (JP)

(72) Inventors: Masafumi Shimozawa, Tokyo (JP); Shin Saito, Tokyo (JP)

(73) Assignee: HITACHI SOLUTIONS, LTD., Tokyo (JP)

( * ) Notice: Subject to any disclaimer, the term of this patent is extended or adjusted under 35 U.S.C. 154(b) by 367 days.

(21) Appl. No.: 17/439,232

(22) PCT Filed: Jun. 24, 2020

(86) PCT No.: PCT/JP2020/024898
§ 371 (c)(1),
(2) Date: Sep. 14, 2021

(87) PCT Pub. No.: WO2021/053919
PCT Pub. Date: Mar. 25, 2021

(65) Prior Publication Data
US 2022/0158757 A1 May 19, 2022

(30) Foreign Application Priority Data
Sep. 17, 2019 (JP) .................................. 2019-168168

(51) Int. Cl.
*H04L 1/00* (2006.01)
*H04L 12/40* (2006.01)
*H04W 4/40* (2018.01)

(52) U.S. Cl.
CPC ............ *H04L 1/0047* (2013.01); *H04L 12/40* (2013.01); *H04W 4/40* (2018.02); *H04L 2012/40215* (2013.01)

(58) Field of Classification Search
None
See application file for complete search history.

(56) References Cited

U.S. PATENT DOCUMENTS

| 2005/0102564 | A1 | 5/2005 | Oeda et al. |
| 2008/0028012 | A1* | 1/2008 | Kato ................... H04L 9/0869 708/250 |

(Continued)

FOREIGN PATENT DOCUMENTS

| CN | 102571784 A | * | 7/2012 |
| CN | 104285377 A | | 1/2015 |

(Continued)

OTHER PUBLICATIONS

Extended European Search Report dated Jan. 19, 2023 for European Patent Application No. 20865785.8.

(Continued)

*Primary Examiner* — Andrew C Oh
(74) *Attorney, Agent, or Firm* — Volpe Koenig

(57) ABSTRACT

A conversion apparatus includes a storage unit storing definition information in which position information and a type of the signal are associated with each other; a decoder referring to, when first reception data is input, the definition information of the first control target to determine a type of a first signal at a first position in the first reception data, and output first input data in which the determined type of the first signal and a value of the first signal in the first reception data are associated with each other; and an encoder referring to the definition information of a second control target to output second input data in which identification information of second computing units that corresponds to the type of the first signal, position information indicating a second position of the first signal, and a value of the first signal are associated with one another.

9 Claims, 21 Drawing Sheets

(56) References Cited

U.S. PATENT DOCUMENTS

| | | | |
|---|---|---|---|
| 2009/0210397 A1* | 8/2009 | Nishihashi | H04L 49/901 |
| 2012/0105637 A1 | 5/2012 | Yousefi et al. | |
| 2014/0032551 A1 | 1/2014 | Matsuda et al. | |
| 2015/0311916 A1 | 10/2015 | Wirola et al. | |
| 2017/0345227 A1* | 11/2017 | Allen, Jr. | G06F 16/951 |
| 2018/0184368 A1 | 6/2018 | Hsiao et al. | |
| 2018/0267510 A1 | 9/2018 | Nishiyama et al. | |
| 2018/0316584 A1 | 11/2018 | Ujiie et al. | |
| 2019/0222423 A1 | 7/2019 | Takemori et al. | |
| 2020/0053112 A1* | 2/2020 | Torisaki | H04L 67/12 |

FOREIGN PATENT DOCUMENTS

| | | | | |
|---|---|---|---|---|
| CN | 108572619 A | | 9/2018 | |
| CN | 109314640 A | | 2/2019 | |
| CN | 109669442 A | | 4/2019 | |
| CN | 110191439 A | | 8/2019 | |
| CN | 110247760 B | * | 6/2022 | ............. H04L 12/40 |
| EP | 1158718 A2 | * | 11/2001 | ....... H04L 12/40039 |
| JP | 2002-228551 A | | 8/2002 | |
| JP | 2005-148779 A | | 6/2005 | |
| JP | 2007168463 A | * | 7/2007 | |
| JP | 2010124086 A | * | 6/2010 | |
| JP | 2011-039834 A | | 2/2011 | |
| JP | 2011248516 A | * | 12/2011 | |
| JP | 2013-003010 A | | 1/2013 | |
| JP | 2014-040781 A | | 3/2014 | |
| JP | 2017-126978 A | | 7/2017 | |
| WO | 2007/091926 A1 | | 8/2007 | |
| WO | WO-2009083078 A1 | * | 7/2009 | ....... H04L 12/40006 |
| WO | WO-2016147590 A1 | * | 9/2016 | ......... B60H 1/00857 |
| WO | 2017/022050 A1 | | 2/2017 | |
| WO | 2019/142741 A1 | | 7/2019 | |
| WO | WO-2019142741 A1 | * | 7/2019 | ............. H04L 12/40 |

OTHER PUBLICATIONS

International Search Report, PCT/JP2020/024898, dated Sep. 8, 2020, 2 pgs.

Chinese Office Action dated Jun. 8, 2023 for Chinese Patent Application No. 202080016594.9.

\* cited by examiner

|  | 1000 | |
|---|---|---|
| 301 | 302 | 304-1 |
| TIME | ID | BYTE 1 DATA |
| 1.001 | AAA | 01 ⎫ |
| 1.003 | BBB | 10 ⎬ READ AS DATA (S905) |
| 1.005 | CCC | 02 ⎭ |
| 1.011 | AAA | 03 |
| 1.013 | BBB | 20 |

READ TIME (1.011[s])

*FIG.13*

CONVERSION APPARATUS, CONVERSION METHOD, AND RECORDING MEDIUM

CLAIM OF PRIORITY

The present application claims priority from Japanese patent application JP 2019-168168 filed on Sep. 17, 2019, the content of which is hereby incorporated by reference into this application.

BACKGROUND

This invention relates to a conversion apparatus for converting data, a conversion method, and a recording medium.

In-vehicle networks (also called "networks in vehicles") are networks used to control devices mounted in vehicles. Specifically, for example, an in-vehicle network includes the following three system networks: a vehicle control system network for controlling a vehicle itself, for example, an adaptive cruise control (ACC) system or an engine; a body system network for controlling a body, for example, doors, switches, and a steering device; and an information system network for controlling information system devices, such as a display, an audio device, an air-conditioner, and a car navigation device. The three system networks are coupled to one another via computing units, for example, electronic control units (ECUs), in respective networks, and in order to adapt to increased performance of the ECUs and complication of wiring, data is communicated based on a communication standard, such as Controller Area Network (CAN), Local Interconnect Network (LIN), or FlexRay.

In-vehicle network logs are log data obtained from the in-vehicle networks. The in-vehicle networks are different for vehicle types, and hence the in-vehicle network logs are also naturally different for vehicle types. Specifically, for example, IDs of ECUs, parameter allocation, and a reception cycle are different for vehicle types.

In JP 2013-3010 A, there is disclosed a determining ECU which is configured to perform various diagnostic processes on an own vehicle, and forms the system. The determining ECU detects a vehicle state of the own vehicle based on a signal from a sensor mounted on another ECU, and information obtained from another ECU through an in-vehicle LAN 50. Then, the determining ECU makes a determination (execution propriety determination) as to whether each diagnostic process can be executed based on, for example, the vehicle state and results of the diagnostic processes, and notifies each ECU of a result of the determination.

In JP 2014-40781 A, there is disclosed a vehicle learning data reuse determination device configured to reuse learning values which are limited to only those required as much as possible for vehicle control. This vehicle learning data reuse determination device determines, when it is determined that at least one pair of an index code of dialogue information actually generated in a vehicle, in which an ECU before replacement is mounted, and a dialogue code stored in a determination table of a new ECU match, that reuse of a learning value corresponding to the dialogue code is forbidden, and rewrites the learning value to an initial value set in advance in the new ECU. Specifically, the vehicle learning data reuse determination device uses the initial value set in the new ECU instead of the learning value to be rewritten.

However, with in-vehicle network logs being different for vehicle types, even when an in-vehicle network log of a vehicle (hereinafter referred to as "vehicle A") of a vehicle type A is applied to a vehicle (hereinafter referred to as "vehicle B") of a vehicle type B, which is different from the vehicle type A, the vehicle B does not operate. The same is true when time-series data of the in-vehicle network log of the vehicle A is only replaced for application to the vehicle B.

As described above, an in-vehicle network log cannot be shared between different vehicle types, and hence in-vehicle network logs are obtained for each vehicle type and used in development under the current circumstances, which is one of factors behind a reduction in ECU development efficiency.

SUMMARY

It is an object of this invention to increase development efficiency of computing units, for example, ECUs.

An aspect of the invention disclosed in this application is a conversion apparatus, comprising: a storage unit configured to store, for each control target to be controlled by computing units, definition information in which position information indicating a position of a value of a signal in data received by the computing units and a type of the signal are associated with each other for each piece of identification information of the computing units; a decoder configured to refer to, when first reception data received by first computing units, which control a first control target, is input, the definition information of the first control target to determine a type of a first signal at a first position in the first reception data, and output first input data in which the determined type of the first signal and a value of the first signal in the first reception data are associated with each other; and an encoder configured to refer to, when the first input data output from the decoder is input, the definition information of a second control target, which is different from the first control target, to output second input data in which a piece of identification information of second computing units that corresponds to the type of the first signal in the first input data, position information indicating a second position of the first signal in second reception data to be received by the second computing units, and a value of the first signal at the second position are associated with one another.

According to the representative embodiment of this invention, the development efficiency of the computing units, for example, the ECUs, can be increased. Other objects, configurations, and effects than those described above are clarified by the following description of an embodiment.

BRIEF DESCRIPTION OF THE DRAWINGS

FIG. 13 is an explanatory diagram for illustrating Example 1 of reading the vehicle A in-vehicle network reception log data (Step S905).

DETAILED DESCRIPTION OF THE PREFERRED EMBODIMENTS

<Reuse Example of In-Vehicle Network Log File>

Figure 1:
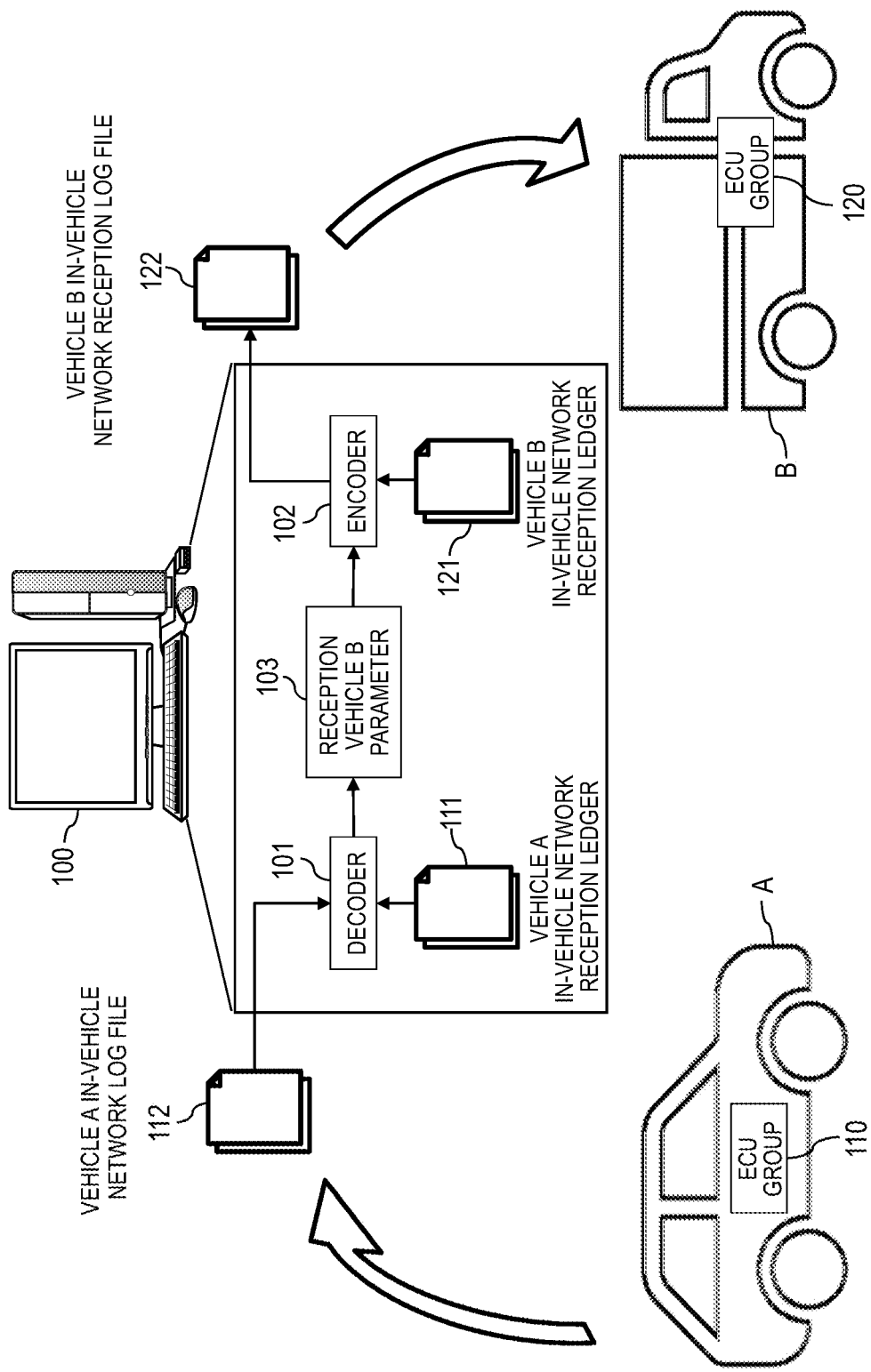
FIG. 1 is an explanatory diagram for illustrating a reuse example of an in-vehicle network log file.

FIG. 1 is an explanatory diagram for illustrating a reuse example of an in-vehicle network log file. FIG. 1 shows an example in which a vehicle A in-vehicle network log file 112 obtained from an ECU group 110 of a vehicle A is used for a vehicle B of a different vehicle type from the vehicle A. The vehicle A in-vehicle network log file 112 is a file in which in-vehicle network logs obtained from the ECU group 110 forming an in-vehicle network of the vehicle A are recorded.

A conversion apparatus 100 converts the vehicle A in-vehicle network log file 112 into a vehicle B in-vehicle network reception log file 122 suitable for the vehicle B. The vehicle B in-vehicle network reception log file 122 is a file in which logs that can be received by an in-vehicle network of the vehicle B are recorded. When the vehicle B in-vehicle network reception log file 122 is applied to an ECU group 120 of the vehicle B, the vehicle B performs operation similar to that of the vehicle A. The ECU group 110 controls the vehicle A as a control target, and the ECU group 120 controls the vehicle B as a control target.

The conversion apparatus 100 includes a decoder 101 and an encoder 102. The decoder 101 refers to a vehicle A in-vehicle network reception ledger 111 to decode the vehicle A in-vehicle network log file 112, and outputs a reception vehicle B parameter 103. The vehicle A in-vehicle network reception ledger 111 is definition information in which specifications of data that can be received in the in-vehicle network of the vehicle A are defined, and is expressed in a table form, for example.

The reception vehicle B parameter 103 is data which is not dependent on differences between the ECU group 110 of the vehicle A and the ECU group 120 of the vehicle B, and in which a type (signal name) of a signal received by the vehicle A and the vehicle B and a physical value of the signal are associated with each other.

The encoder 102 refers to a vehicle B in-vehicle network reception ledger 121 to encode the reception vehicle B parameter 103, and outputs the vehicle B in-vehicle network reception log file 122. The vehicle B in-vehicle network reception ledger 121 is definition information in which specifications of data that can be received in the in-vehicle network of the vehicle B are defined, and is expressed in a table form, for example. The vehicle B in-vehicle network reception log file 122 is read into the ECU group 120 of the vehicle B.

As described above, the vehicle A in-vehicle network log file 112 can be automatically converted into the vehicle B in-vehicle network reception log file 122 by the conversion apparatus 100. Therefore, the vehicle A in-vehicle network log file 112 can be shared with the vehicle B, and ECU development efficiency can be increased. In at least one embodiment of this invention, there is described a conversion example for the case in which the vehicle A in-vehicle network log file 112 is applied to the vehicle B, but a conversion example for a case in which an in-vehicle network log file of the vehicle B is applied to the vehicle A is similarly executed. Therefore, the in-vehicle network logs can be shared between the vehicle types A and B, and the ECU development can be increased in efficiency.

<Hardware Configuration Example of the Conversion Apparatus 100>

Figure 2:
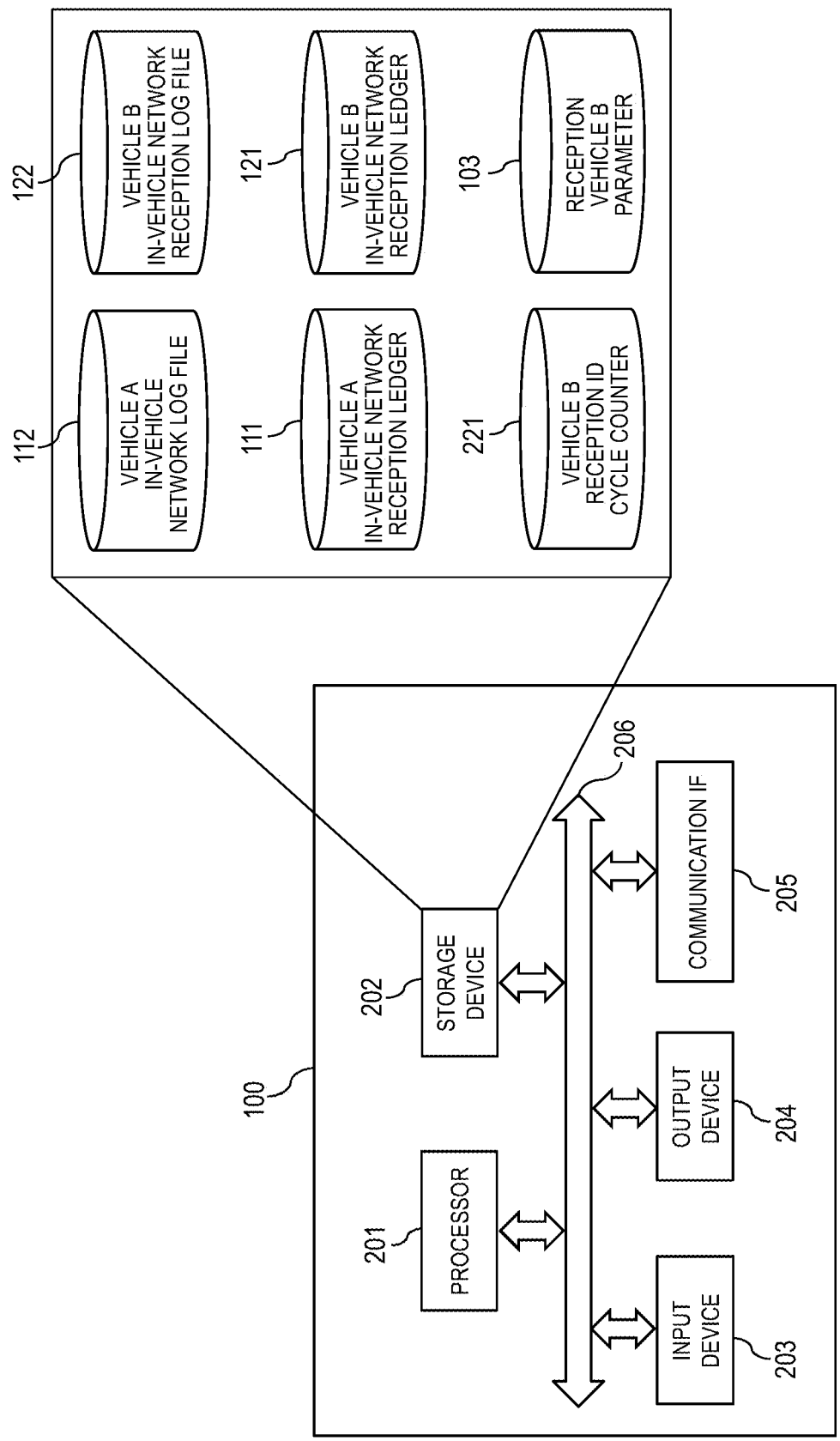
FIG. 2 is a block diagram for illustrating a hardware configuration example of the conversion apparatus.

FIG. 2 is a block diagram for illustrating a hardware configuration example of the conversion apparatus 100. The conversion apparatus 100 includes a processor 201, a storage device 202, an input device 203, an output device 204, and a communication interface (communication IF) 205. The processor 201, the storage device 202, the input device 203, the output device 204, and the communication IF 205 are coupled to one another through a bus 206. The processor 201 is configured to control the conversion apparatus 100. The storage device 202 serves as a work area for the processor 201. The storage device 202 is also a non-transitory or transitory recording medium configured to store various programs and various kinds of data. Examples of the storage device 202 include a read only memory (ROM), a random access memory (RAM), a hard disk drive (HDD), and a flash memory. The input device 203 is configured to input data. Examples of the input device 203 include a keyboard, a mouse, a touch panel, a numeric keypad and a scanner. The output device 204 is configured to output data. Examples of the output device 204 include a display and a printer. The communication IF 205 is coupled to the network, and is configured to transmit and receive data.

The decoder 101 and the encoder 102 illustrated in FIG. 1 are specifically functions realized by, for example, causing the processor 201 to execute a program stored in the storage device 202.

Further, the storage device 202 stores the vehicle A in-vehicle network log file 112 obtained from the ECU group 110 of the vehicle A. Still further, the storage device 202 stores the reception vehicle B parameter 103 generated and updated by the decoder 101 and the encoder 102. Yet further, the storage device 202 stores the vehicle B in-vehicle network reception log file 122 generated by the encoder 102. Yet further, the storage device 202 stores the vehicle A in-vehicle network reception ledger 111 and the vehicle B in-vehicle network reception ledger 121, which are illustrated in FIG. 1, and a vehicle B reception ID cycle counter 221.

The vehicle A in-vehicle network log file 112, the reception vehicle B parameter 103, the vehicle B in-vehicle network reception log file 122, the vehicle A in-vehicle network reception ledger 111, the vehicle B in-vehicle network reception ledger 121, and the vehicle B reception ID cycle counter 221 may be stored in a storage device 202 of another computer that is external to the conversion apparatus 100 and is accessible by the conversion apparatus 100.

<Log File>

Next, stored contents of a log file for each vehicle are described with reference to FIG. 3 and FIG. 4.

Figure 3:
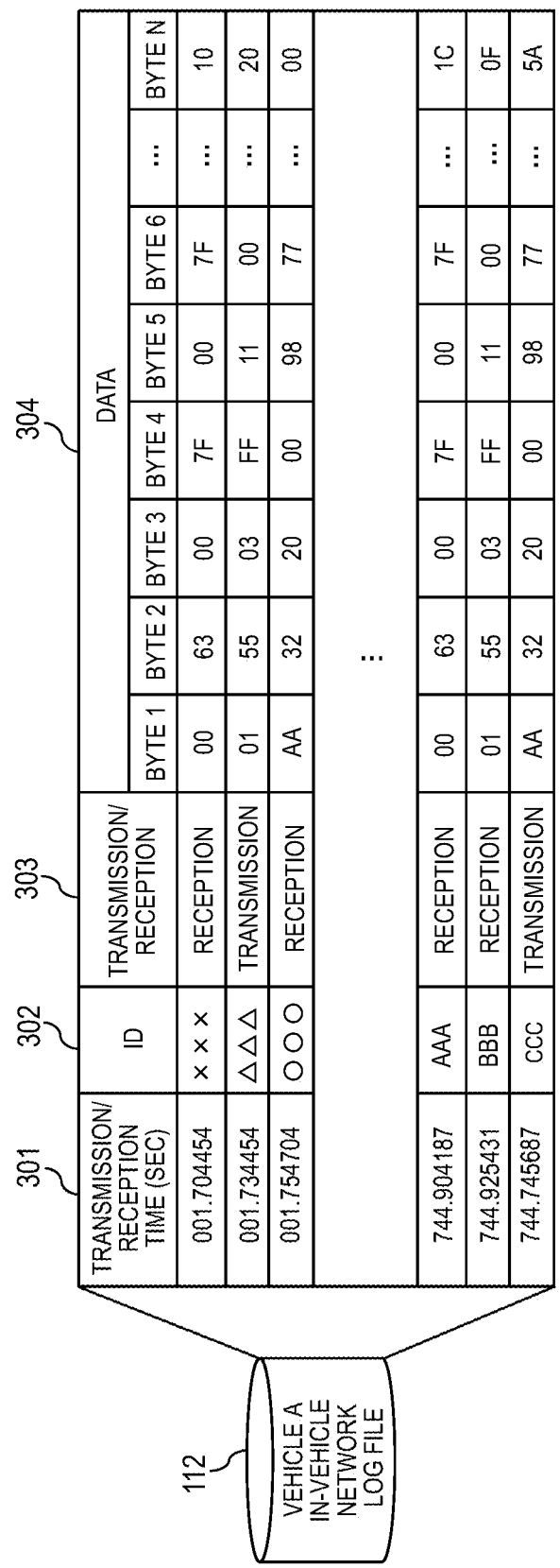
FIG. 3 is an explanatory diagram for illustrating an example of the vehicle A in-vehicle network log file.

FIG. 3 is an explanatory diagram for illustrating an example of the vehicle A in-vehicle network log file 112. The vehicle A in-vehicle network log file 112 is a file in which vehicle A in-vehicle network logs are recorded. The vehicle A in-vehicle network log file 112 includes, as fields, a transmission/reception time 301, an ID 302, transmission/reception 303, and data 304. A combination of values of the respective fields 301 to 304 in the same row forms one vehicle A in-vehicle network log.

The transmission/reception time 301 is a field storing, as a value, a time at which the vehicle A in-vehicle network log is transmitted or received. In the following description, a value of an AA field bbb (AA is a field name, and bbb is a reference numeral) may be represented by AA bbb. For example, the value of the transmission/reception time 301 is represented as the transmission/reception time 301.

The ID 302 is a field storing, as a value, identification information of an ECU that has transmitted or received data indicating the vehicle A in-vehicle network log. The transmission/reception 303 is a field storing, as a value, information indicating whether the data indicating the vehicle A in-vehicle network log has been transmitted or received. When the value is "transmission," the entry is data transmitted by an ECU identified by the ID 302, and when the value is "reception," the entry is data received by an ECU identified by the ID 302. The data 304 is a field storing, as values, values of data indicating the vehicle A in-vehicle network log and their positions (Byte 1, Byte 2, . . . , Byte N) in units of a byte.

Figure 4:
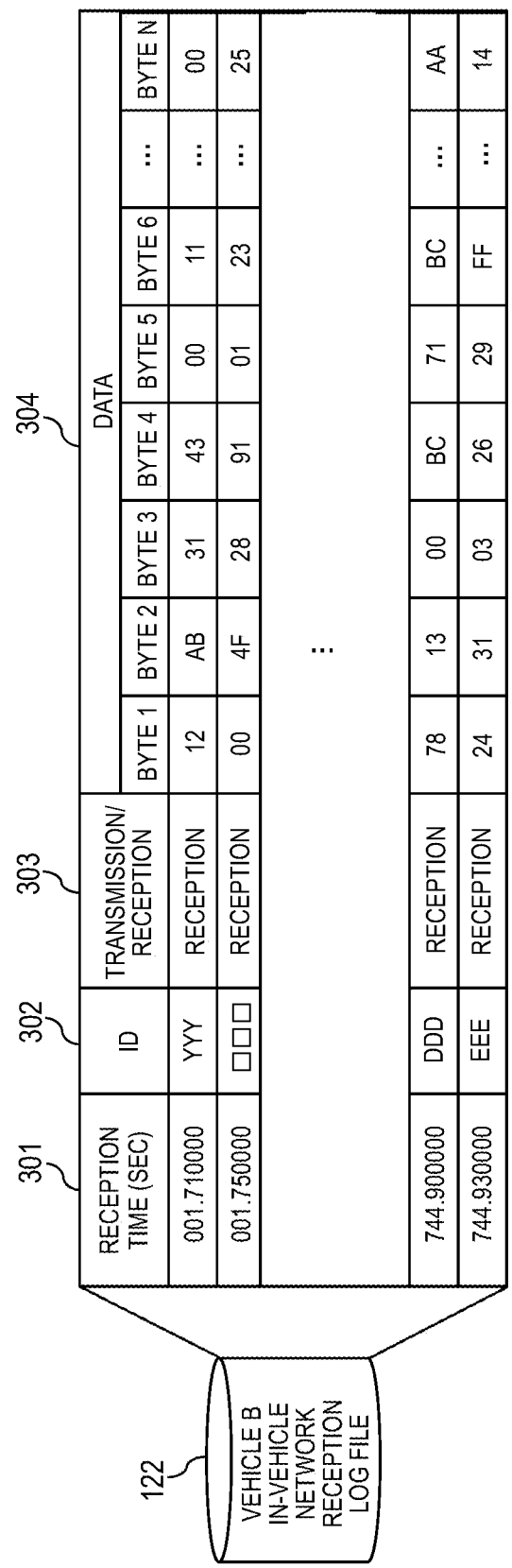
FIG. 4 is an explanatory diagram for illustrating an example of the vehicle B in-vehicle network reception log file.

FIG. 4 is an explanatory diagram for illustrating an example of the vehicle B in-vehicle network reception log file 122. The vehicle B in-vehicle network reception log file 122 includes the same fields 301 to 304 as those of the vehicle A in-vehicle network log file 112. It should be noted, however, that values of the respective fields 301 to 304 are values converted by the conversion apparatus 100, that is, values suitable for the vehicle B. A combination of values of the respective fields 301 to 304 in the same row forms one vehicle B in-vehicle network reception log.

<In-Vehicle Network Reception Ledger>

Next, stored contents of an in-vehicle network reception ledger for each vehicle are described with reference to FIG. 5 and FIG. 6.

Figure 5:
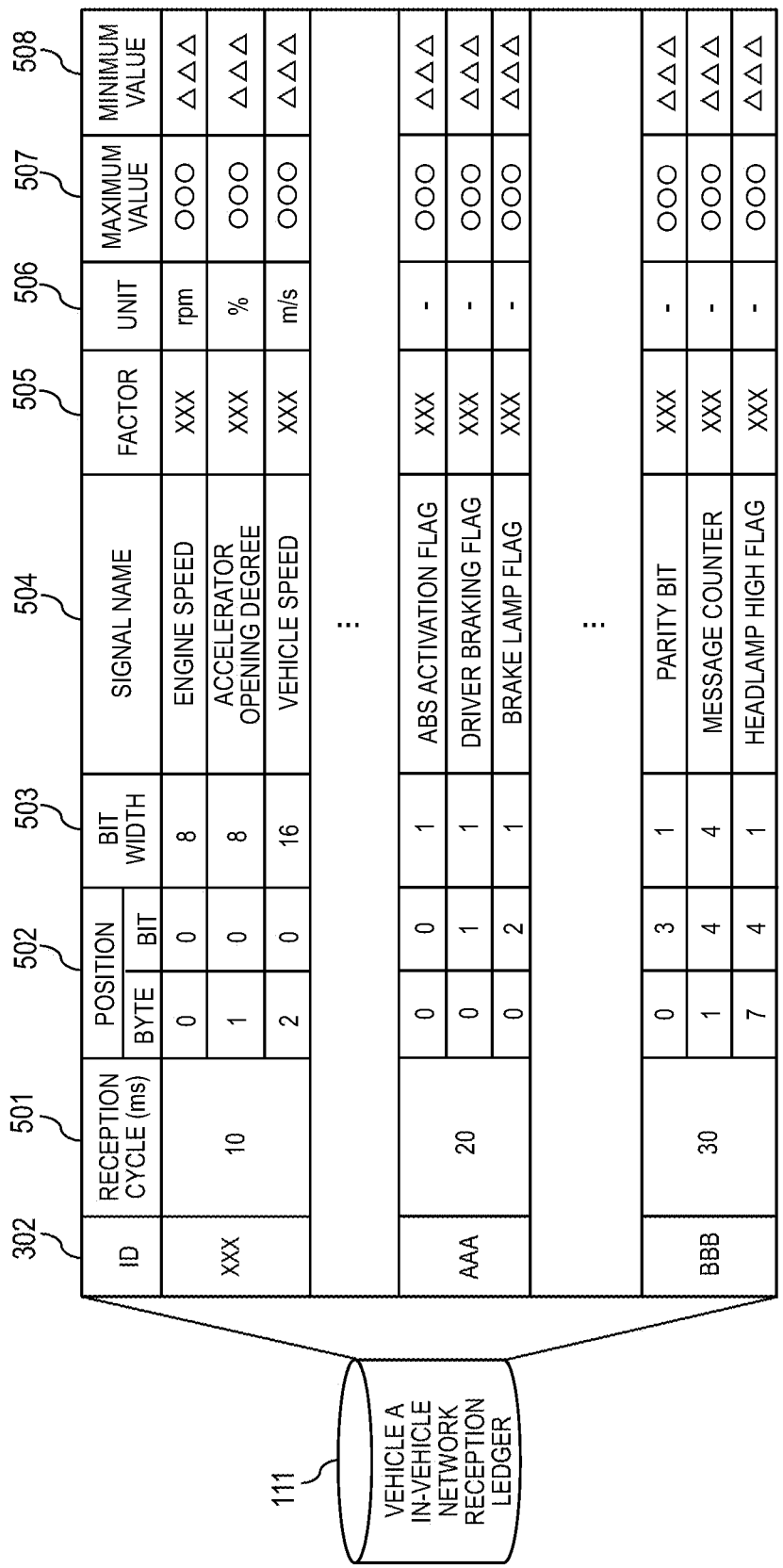
FIG. 5 is an explanatory diagram for illustrating an example of stored contents of the vehicle A in-vehicle network reception ledger.
Figure 6:
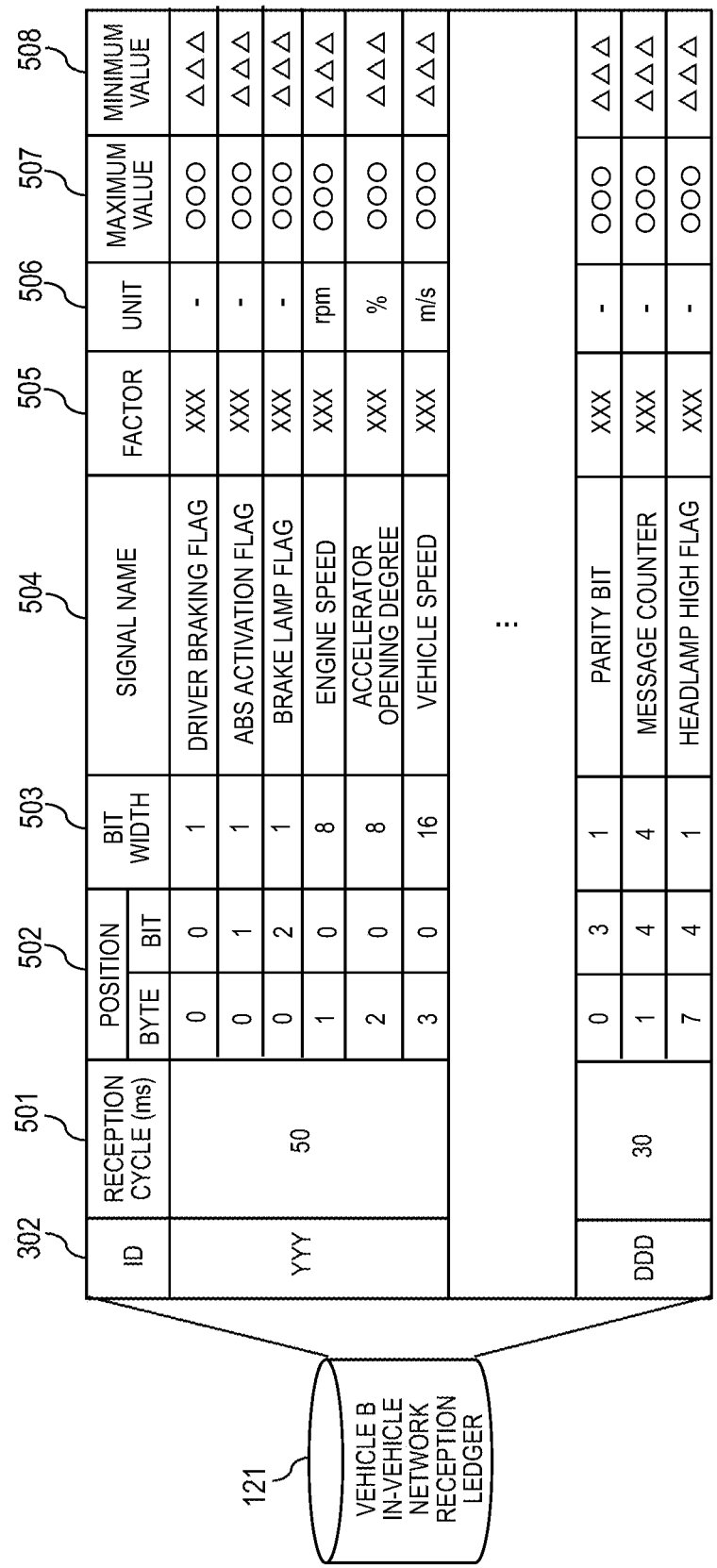
FIG. 6 is an explanatory diagram for illustrating an example of the vehicle B in-vehicle network reception ledger.

FIG. 5 is an explanatory diagram for illustrating an example of stored contents of the vehicle A in-vehicle network reception ledger 111. FIG. 6 is an explanatory diagram for illustrating an example of the vehicle B in-vehicle network reception ledger 121. The vehicle A in-vehicle network reception ledger 111 includes, as fields, the ID 302, a reception cycle 501, a position 502, a bit width 503, a signal name 504, a factor 505, a unit 506, a maximum value 507, and a minimum value 508. A combination of values of the respective fields 302 and 501 to 508 in the same row defines specifications of one signal identified by the signal name 504 as an entry.

The ID 302 is the identification information for uniquely identifying an ECU, and hence when there are a plurality of signals that can be received by the ECU, one ID 302 is included in a plurality of entries. The reception cycle 501 is a field storing, as a value, a cycle in which the ECU receives data including the signal. The position 502 is a field storing, as fields, position information indicating at which position 502 (byte position and bit position) of received data including the signal the signal is stored.

The bit width 503 is a field storing, as a value, a width of a bit string indicating the signal in the received data including the signal. The signal name 504 is a field storing, as a value, a name representing a type of the signal.

The factor 505 is a numerical value for normalizing a physical value of the signal as a value. For example, when the unit 506 of the physical value of the signal is km/s, and it is desired to output the physical quantity in m/s from the decoder 101, "0.001" is set to the factor 505 of the signal in the vehicle A in-vehicle network reception ledger 111. As a result, the physical quantity can be normalized. Therefore, the encoder 102 can receive the physical quantity in the unit 506 of m/s instead of km/s.

Further, when the unit 506 of the physical quantity of the signal is km/s, and the physical quantity is input in m/s from the decoder 101, for example, "1,000" is set to the factor 505 of the signal in the vehicle B in-vehicle network reception ledger 121. As a result, the physical quantity can be normalized. Therefore, the encoder 102 can process the physical quantity in the unit 506 of km/s instead of m/s.

The unit 506 is a field storing, as a value, a measurement reference (e.g., rpm, %, and m/s) of the physical quantity representing the signal. The maximum value 507 is a field storing, as a value, a maximum value (upper limit value) the signal can take. The minimum value 508 is a field storing, as a value, a minimum value (lower limit value) the signal can take.

<Vehicle B Reception ID Cycle Counter 221>

Figure 7:
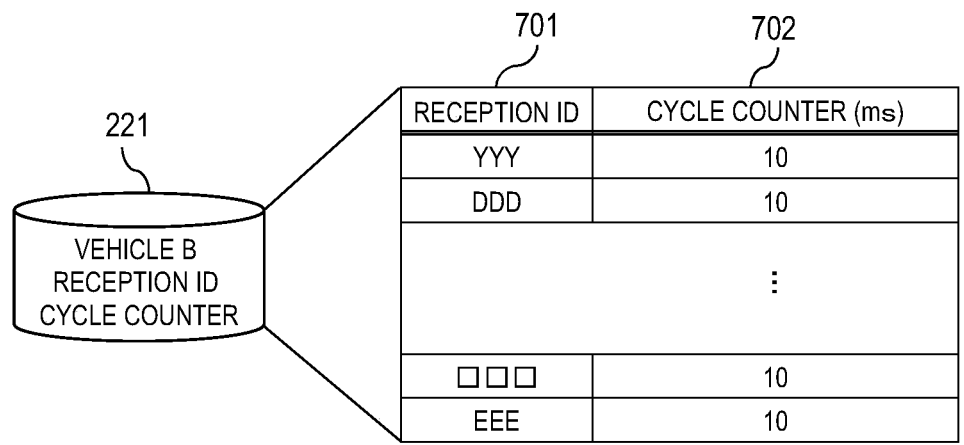
FIG. 7 is an explanatory diagram for illustrating an example of the vehicle B reception ID cycle counter.

FIG. 7 is an explanatory diagram for illustrating an example of the vehicle B reception ID cycle counter 221. The vehicle B reception ID cycle counter 221 is a cycle counter used for each ECU in the in-vehicle network of the vehicle B to receive a signal. The vehicle B reception ID cycle counter 221 includes, as fields, a reception ID 701 and a cycle counter 702. A combination of values of the respective fields 701 and 702 in the same row defines a counter value for counting a cycle of one ECU.

The reception ID 701 is a field storing, as a value, a value of the ID 302 for uniquely identifying an ECU that receives a signal. The cycle counter 702 is a field storing, as a value, a value for counting a cycle in which the ECU receives the signal. When the value of the cycle counter 702 is "10" ms, the ECU receives the signal every 10 ms.

<Reception Vehicle B Parameter 103>

Figure 8:
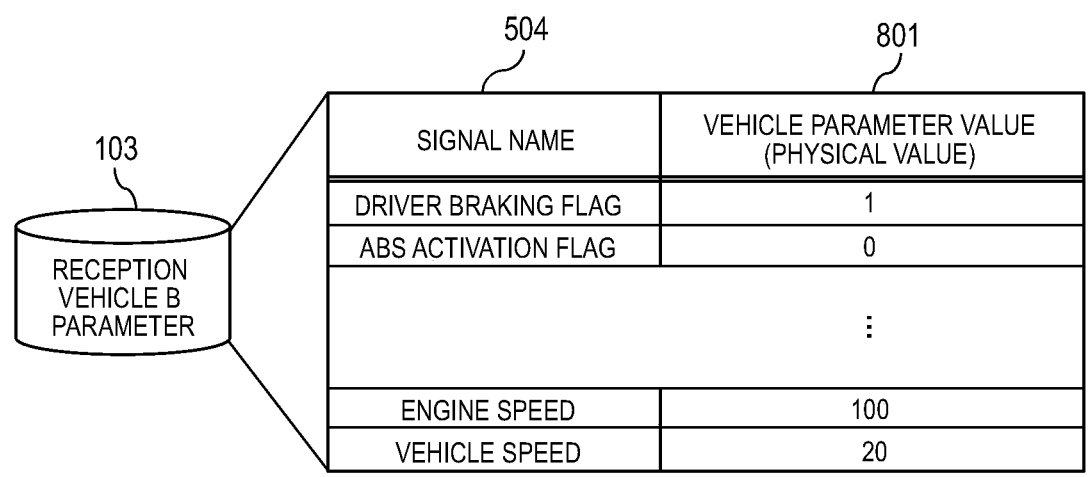
FIG. 8 is an explanatory diagram for illustrating an example of the reception vehicle B parameter.

FIG. 8 is an explanatory diagram for illustrating an example of the reception vehicle B parameter 103. The reception vehicle B parameter 103 includes, as fields, the signal name 504 and a vehicle parameter value 801. A combination of values of the respective fields 504 and 801 in the same row defines a physical value of a vehicle parameter of the signal. The vehicle parameter value 801 is a field storing, as a value, a value (physical value) of the vehicle parameter of the signal.

<Decoding Process to be Performed by Decoder 101>

Figure 9:
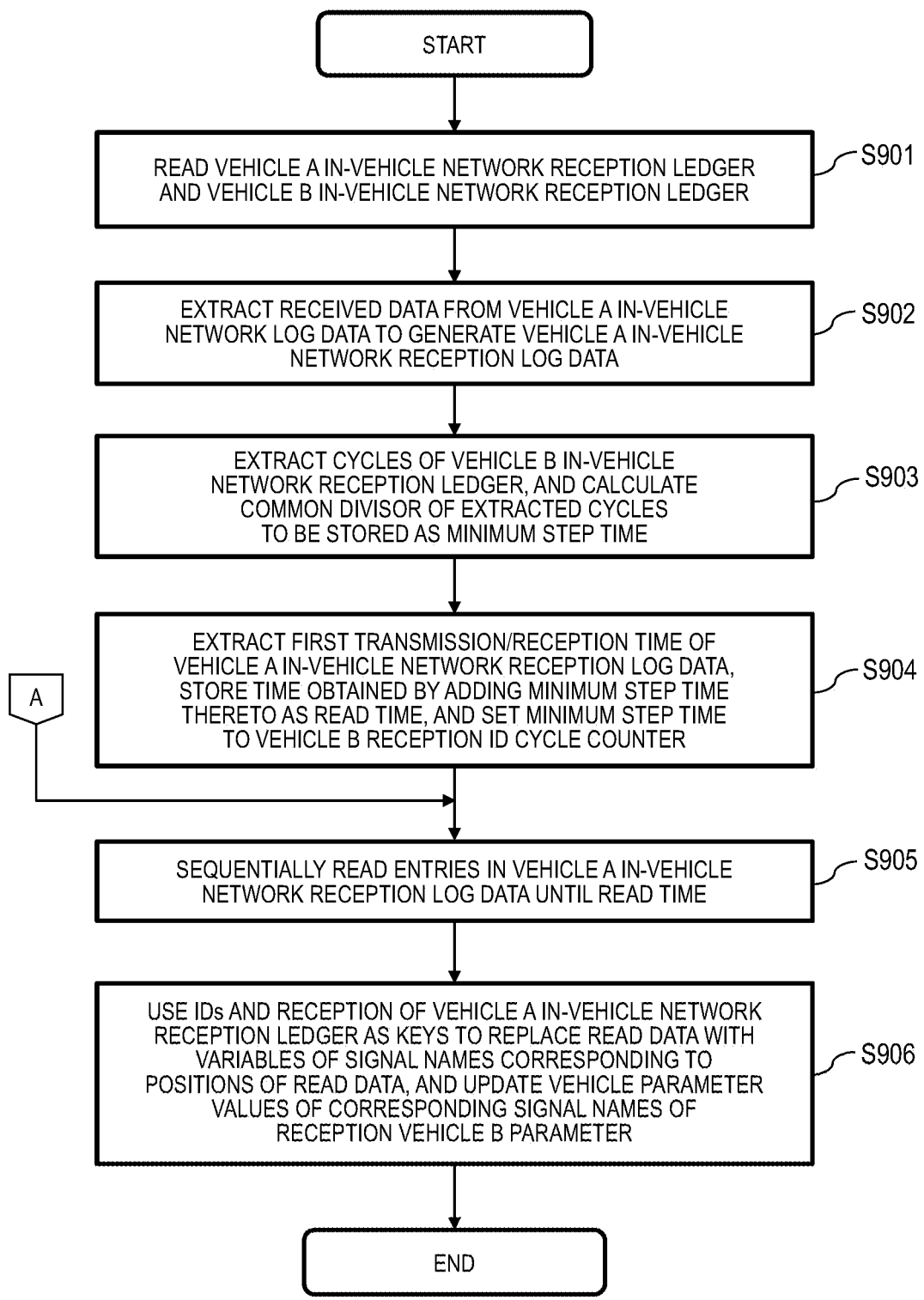
FIG. 9 is a flow chart for illustrating a detailed process procedure example of a decoding process to be performed by the decoder.

FIG. 9 is a flow chart for illustrating a detailed process procedure example of a decoding process to be performed by the decoder 101. The decoder 101 reads the vehicle A in-vehicle network reception ledger 111 and the vehicle B in-vehicle network reception ledger 121 from the storage device 202 (Step S901).

Next, the decoder 101 extracts the received data from the vehicle A in-vehicle network log file 112 to generate vehicle A in-vehicle network reception log data (Step S902). A specific example of Step S902 is illustrated in FIG. 10.

Figure 10:
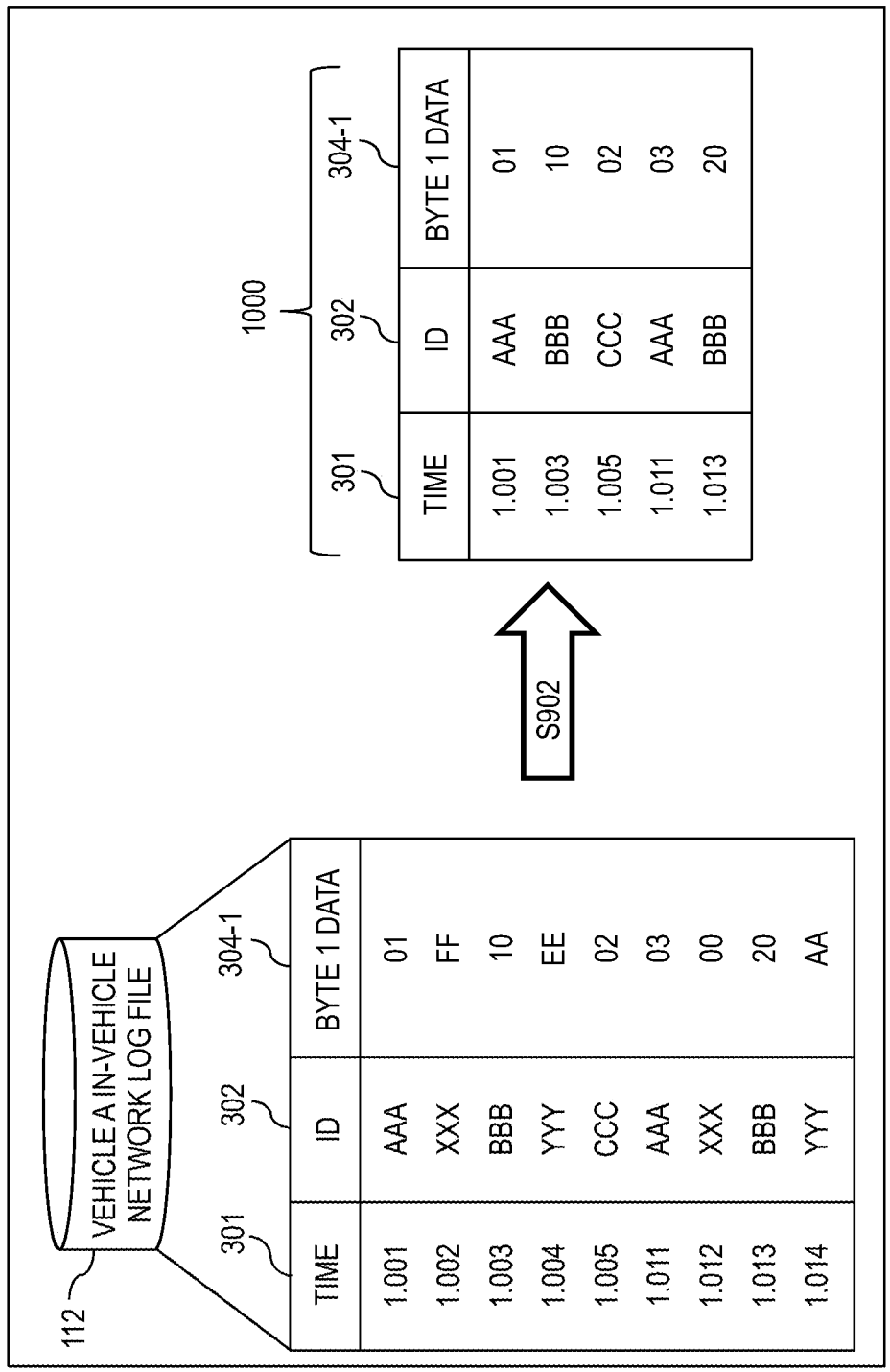
FIG. 10 is an explanatory diagram for illustrating an example of generating vehicle A in-vehicle network reception log data (Step S902) illustrated in FIG. 9.

FIG. 10 is an explanatory diagram for illustrating an example of generating vehicle A in-vehicle network reception log data 1000 (Step S902) illustrated in FIG. 9. In FIG. 10, in order to simplify the description, some fields of the vehicle A in-vehicle network log file 112 are shown as excerpts. A reference numeral 304-1 denotes the "Byte 1" field in the data 304.

In Step S902, the decoder 101 refers to the vehicle A in-vehicle network reception ledger 111 to determine, from the vehicle A in-vehicle network log file 112, IDs 302 that are not found in the vehicle A in-vehicle network reception ledger 111. In FIG. 10, the IDs 302 that are not found in the vehicle A in-vehicle network reception ledger 111 are represented as "XXX" and "YYY."

The decoder 101 deletes entries having the IDs 302 of "XXX" and "YYY" from the vehicle A in-vehicle network log file 112. The remaining entries in the vehicle A in-vehicle network log file 112 form the vehicle A in-vehicle network reception log data 1000. In this manner, unnecessary data conversion is suppressed, and the ECU development efficiency can be increased.

Returning to FIG. 9, the decoder 101 extracts cycles of the vehicle B in-vehicle network reception ledger 121, and calculates a common divisor of the extracted cycles to be stored as a minimum step time in the storage device 202 (Step S903). A specific example of Step S903 is illustrated in FIG. 11.

Figure 11:
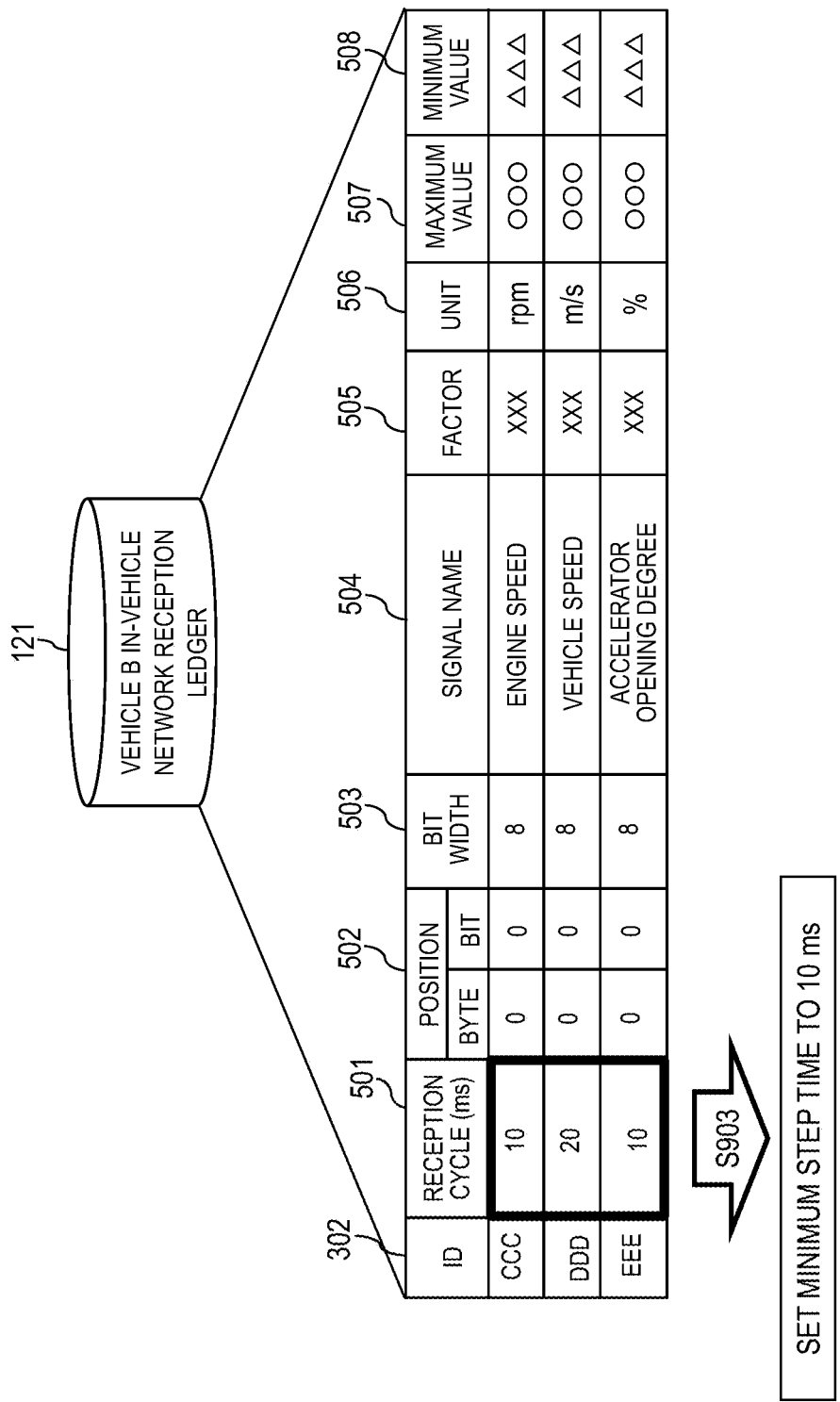
FIG. 11 is an explanatory diagram for illustrating an example of setting the minimum step time (Step S903) illustrated in FIG. 9.

FIG. 11 is an explanatory diagram for illustrating an example of setting the minimum step time (Step S903) illustrated in FIG. 9. In the vehicle B in-vehicle network reception ledger 121, the reception cycle 501 includes the following two types: "10" and "20." The decoder 101 calculates common divisors {1, 2, 5, 10} of "10" and "20." The decoder 101 selects one of the common divisors {1, 2, 5, 10} to be set as the minimum step time.

In FIG. 11, the decoder 101 sets the greatest common divisor "10" of the common divisors {1, 2, 5, 10} as the minimum step time, but the minimum step time may be a common divisor other than the greatest common divisor. As a result, the conversion apparatus 100 can convert signals having diverse reception cycles 501 at once at the minimum step time, and the ECU development efficiency can be increased.

Returning to FIG. 9, the decoder 101 extracts the first value (hereinafter referred to as "first transmission/reception time 301") of the transmission/reception times 301 in the vehicle A in-vehicle network reception log data 1000 generated in Step S902, stores, as a read time in the storage device 202, a time obtained by adding the minimum step time to the extracted first transmission/reception time 301, and sets the minimum step time to the vehicle B reception ID cycle counter 221 (Step S904). A specific example of Step S904 is illustrated in FIG. 12.

Figure 12:
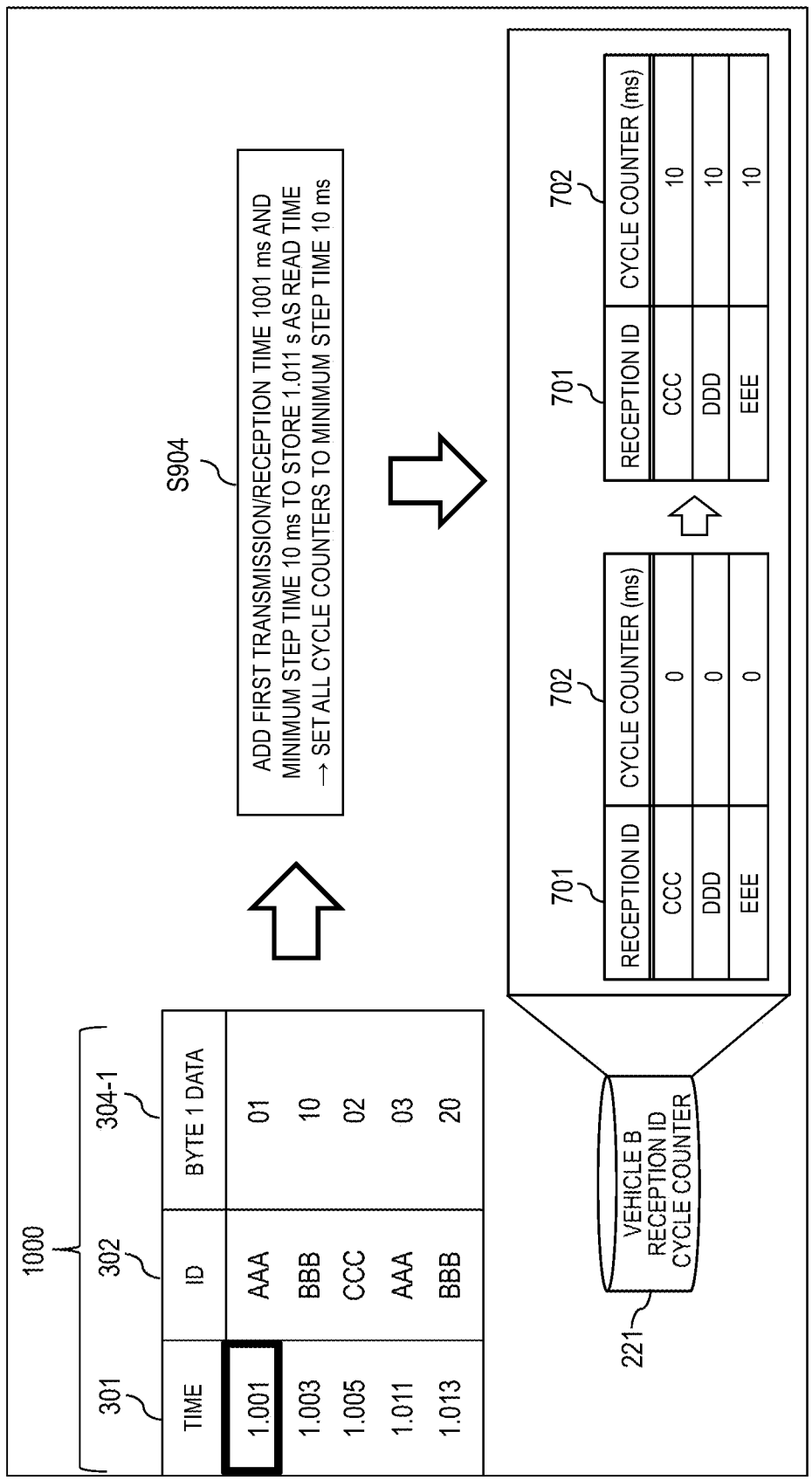
FIG. 12 is an explanatory diagram for illustrating an example of setting the vehicle B reception ID cycle counter (Step S904) illustrated in FIG. 9.

FIG. 12 is an explanatory diagram for illustrating an example of setting the vehicle B reception ID cycle counter 221 (Step S904) illustrated in FIG. 9. First, the decoder 101 extracts "1.001" as the first transmission/reception time 301 of the vehicle A in-vehicle network reception log data 1000 (thick frame of FIG. 12). Next, the decoder 101 adds 10 ms being the minimum step time set in Step S903 to 1.001 s being the extracted first transmission/reception time 301 to obtain 1.011 s being a result of calculation.

The decoder 101 stores 1.011 s being the result of calculation as the read time in the storage device 202. Then, the decoder 101 sets every value of the cycle counter 702 of the vehicle B reception ID cycle counter 221 to 10 ms being the minimum step time. As described later with reference to FIG. 17 and FIG. 21, data of IDs 302 of the ECU group 120 for which the reception cycle 501 matches the cycle counter 702 is added to the vehicle B in-vehicle network reception log file 122. Therefore, a data group in which reception timings are in chronological order is generated. Therefore, data can be supplied to the ECU group 120 of the vehicle B in chronological order, and reproducibility can be increased.

Returning to FIG. 9, the decoder 101 sequentially reads entries in the vehicle A in-vehicle network reception log data 1000 until the read time (Step S905). Specific Example 1 of Step S905 is illustrated in FIG. 13.

FIG. 13 is an explanatory diagram for illustrating Example 1 of reading the vehicle A in-vehicle network reception log data 1000 (Step S905). The decoder 101 reads, from the vehicle A in-vehicle network reception log data 1000, entries found in a period from 1.001 s being the first transmission/reception time 301 to the read time 1.011 s set in Step S904 (not including 1.011 s). In FIG. 13, entries having the transmission/reception time 301 of "1.001," "1.003," and "1.005" are read. The read time is set to "1.021" in the next Step S904, and hence entries having the transmission/reception time 301 of "1.011" and "1.013" are read in processing of the next Step S905.

Returning to FIG. 9, the decoder 101 uses, as keys, entries in the vehicle A in-vehicle network log file 112 which match the IDs 302 of the vehicle A in-vehicle network reception ledger 111, and for which the transmission/reception 303 is "reception" to replace the vehicle A in-vehicle network reception log data 1000 by variables of the signal names 504 corresponding to the positions 502 of the vehicle A in-vehicle network reception log data 1000, and to update the vehicle parameter values 801 of the corresponding signal names 504 of the reception vehicle B parameter 103 (Step S906). A specific example of Step S906 is illustrated in FIG. 14.

Figure 14:
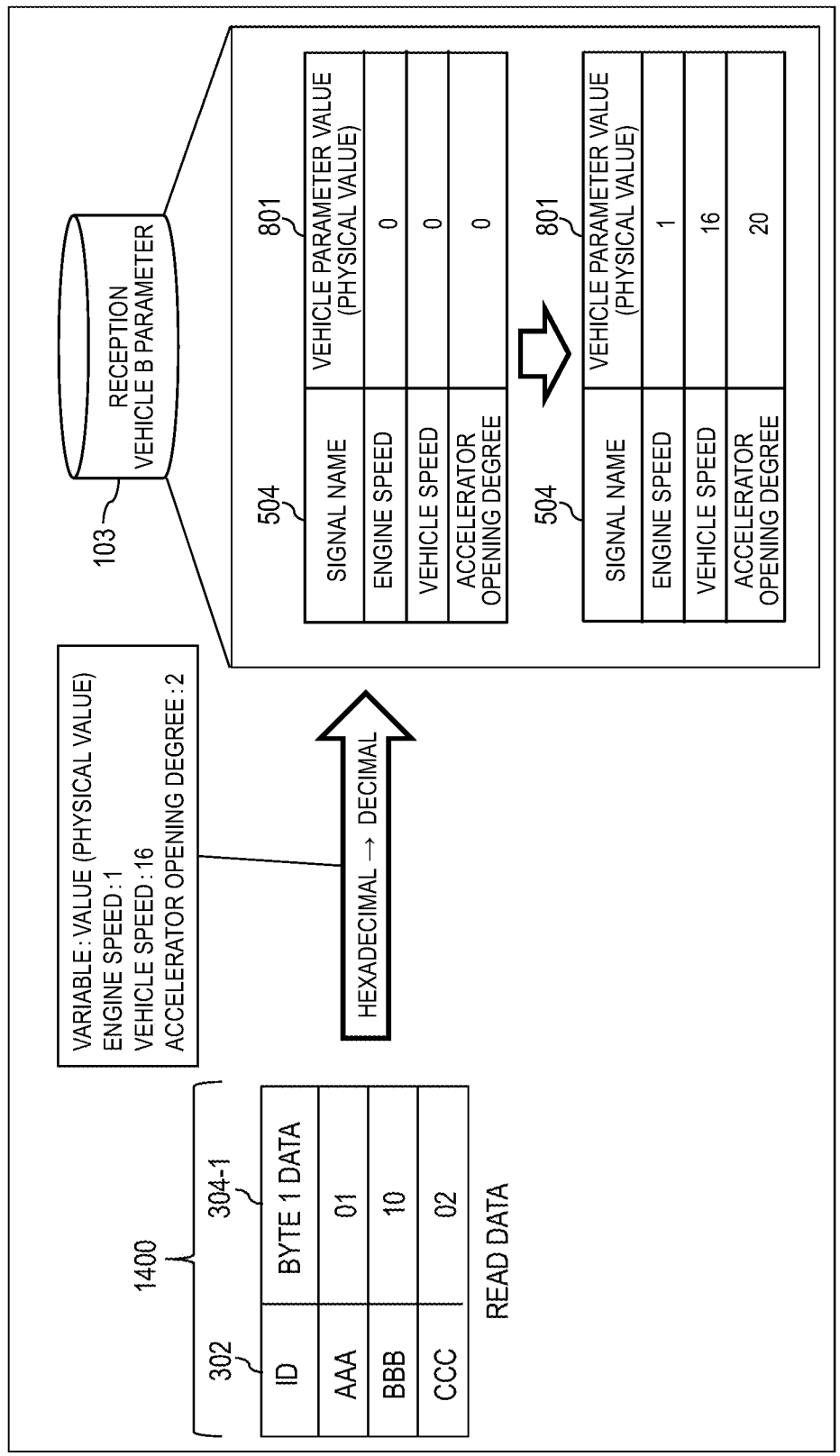
FIG. 14 is an explanatory diagram for illustrating Example 1 of updating the vehicle parameter value 801 (Step S906).

FIG. 14 is an explanatory diagram for illustrating Example 1 of updating the vehicle parameter value 801 (Step S906). Read data 1400 is the entries read in Step S905. The decoder 101 replaces the read data 1400, specifically, a value of the Byte 1 data 304-1 indicating the position 502 of Byte 1 of the read data 1400 by a variable of the corresponding signal name 504.

In the case of this example, the signal name 504 corresponding to the entry (ID 302: AAA) in Row 1 of the read data 1400 is "engine speed," and hence a hexadecimal value "01" of the Byte 1 data 304-1 is converted into a decimal number and multiplied by the factor 505 (in this example, "1") to be replaced by a variable "1". Then, the decoder 101 updates, in the reception vehicle B parameter 103, "0" being the vehicle parameter value 801 of an entry having the same signal name 504 as "engine speed" being the signal name 504 of the replacement variable "1" to the replacement variable "1".

The signal name 504 corresponding to the entry (ID 302: BBB) in Row 2 of the read data 1400 is "vehicle speed," and hence a hexadecimal value "10" of the Byte 1 data 304-1 is converted into a decimal number and multiplied by a value of the factor 505 (in this example, "1") to be replaced by a variable "16". Then, the decoder 101 updates, in the reception vehicle B parameter 103, "0" being the vehicle parameter value 801 of an entry having the same signal name 504 as "vehicle speed" being the signal name 504 of the replacement variable "16" to the replacement variable "16".

The signal name 504 corresponding to an entry (ID 302: CCC) in Row 3 of the read data 1400 is "accelerator opening degree," and hence a hexadecimal value "02" of the Byte 1 data 304-1 is converted into a decimal number and multiplied by the factor 505 (in this example, "1") to be replaced by a variable "2". Then, the decoder 101 updates, in the reception vehicle B parameter 103, "0" being the vehicle parameter value 801 of the entry having the same signal name 504 as "accelerator opening degree" being the signal name 504 of the replacement variable "2" to the replacement variable "2".

As a result, the updated reception vehicle B parameter 103 is output from the decoder 101 to the encoder 102, and the decoding process is ended.

<Encoding Process to be Performed by Encoder 102>

Figure 15:
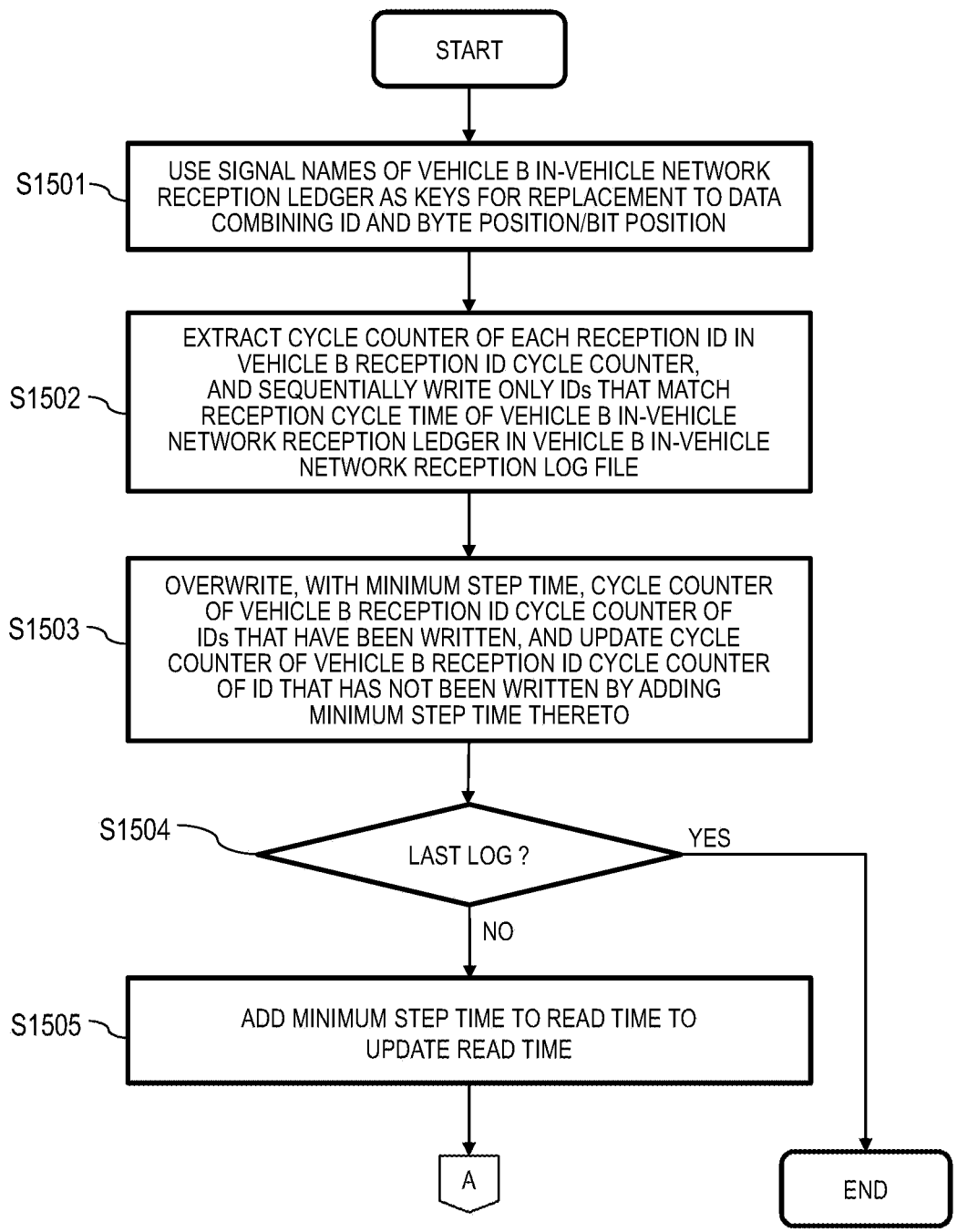
FIG. 15 is a flow chart for illustrating a detailed process procedure example of an encoding process to be performed by the encoder.

FIG. 15 is a flow chart for illustrating a detailed process procedure example of an encoding process to be performed by the encoder 102. The encoder 102 starts the encoding process when the reception vehicle B parameter 103 is input from the decoder 101.

First, the encoder 102 uses the signal names 504 of the vehicle B in-vehicle network reception ledger 121 as keys to replace the reception vehicle B parameter 103 by data combining the ID 302 and the position 502 (Step S1501). The data replaced in Step S1501 is referred to as "replaced data." A specific example of Step S1501 is illustrated in FIG. 16.

Figure 16:
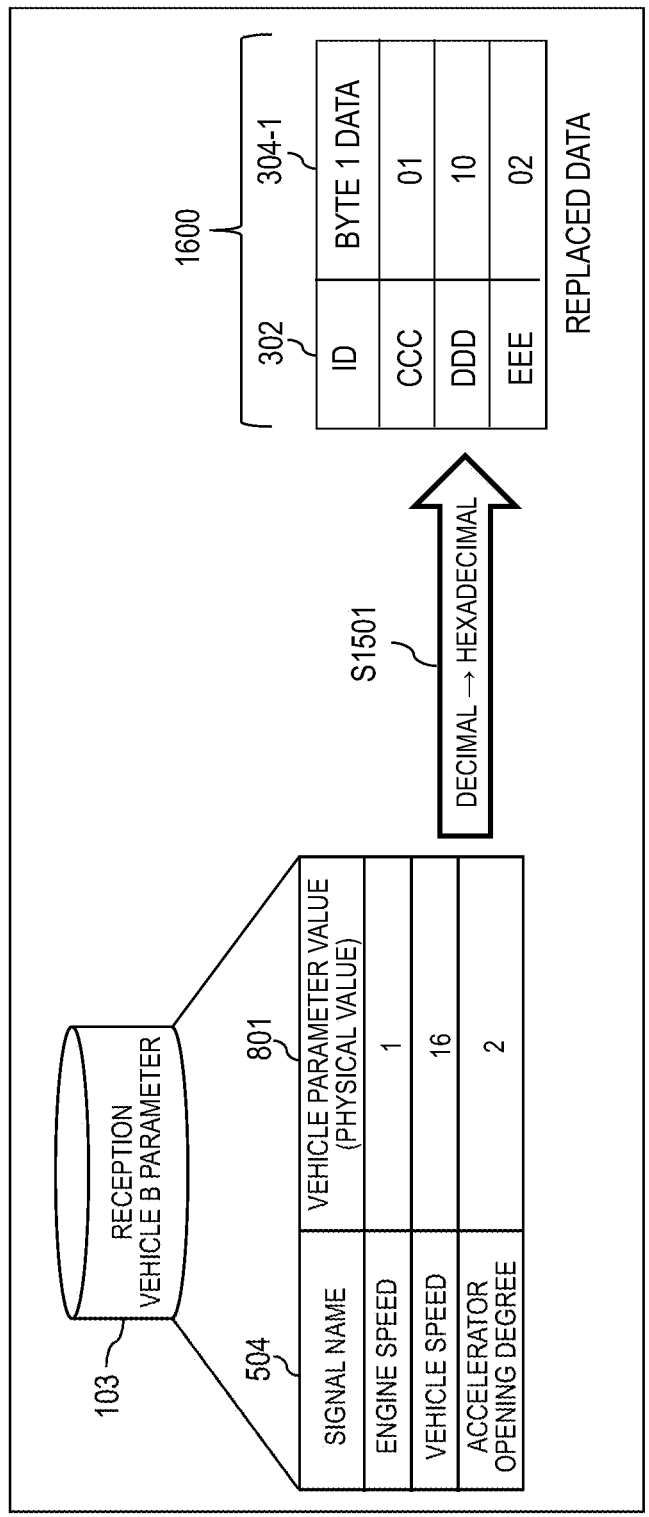
FIG. 16 is an explanatory diagram for illustrating Example 1 of generating the replaced data.

FIG. 16 is an explanatory diagram for illustrating Example 1 of generating the replaced data. The encoder 102 refers to the vehicle B in-vehicle network reception ledger 121 to determine a value of the ID 302 corresponding to the signal name 504 of the reception vehicle B parameter 103. For example, a value of the ID 302 corresponding to the value "engine speed" of the signal name 504 is "CCC." A value of the ID 302 corresponding to the value "vehicle speed" of the signal name 504 is "DDD." A value of the ID 302 corresponding to the value "accelerator opening degree" of the signal name 504 is "EEE."

Further, the encoder 102 multiplies the vehicle parameter value 801 of the reception vehicle B parameter 103 by the factor 505 (in this example, "1"), then converts the resultant from a decimal number to a hexadecimal number, and associates the resultant having the ID 302 corresponding to the signal name 504 of the reception vehicle B parameter 103. For example, a value "1" of the vehicle parameter value 801 of the engine speed is replaced by a value "01" of the Byte 1 data 304-1 having the ID 302 of "CCC." A value "16" of the vehicle parameter value 801 of the vehicle speed is replaced by a value "10" of the Byte 1 data 304-1 having the ID 302 of "DDD." A value "2" of the vehicle parameter value 801 of the accelerator opening degree is replaced by a value "02" of the Byte 1 data 304-1 having the ID 302 of "EEE." As a result, replaced data 1600 is generated.

Returning to FIG. 15, the encoder 102 extracts the cycle counter 702 of each reception ID 701 in the vehicle B reception ID cycle counter 221, and sequentially writes only the IDs 302 that match the reception cycle 501 of the vehicle B in-vehicle network reception ledger 121 in the vehicle B in-vehicle network reception log file 122 (Step S1502).

Then, the encoder 102 overwrites, with the minimum step time, the cycle counter 702 of the vehicle B reception ID cycle counter 221 of the IDs 302 that have been written in Step S1502, and updates the cycle counter 702 of the vehicle B reception ID cycle counter 221 of the ID 302 that has not been written by adding the minimum step time thereto (Step S1503). A specific example of Step S1502 and Step S1503 is illustrated in FIG. 17.

Figure 17:
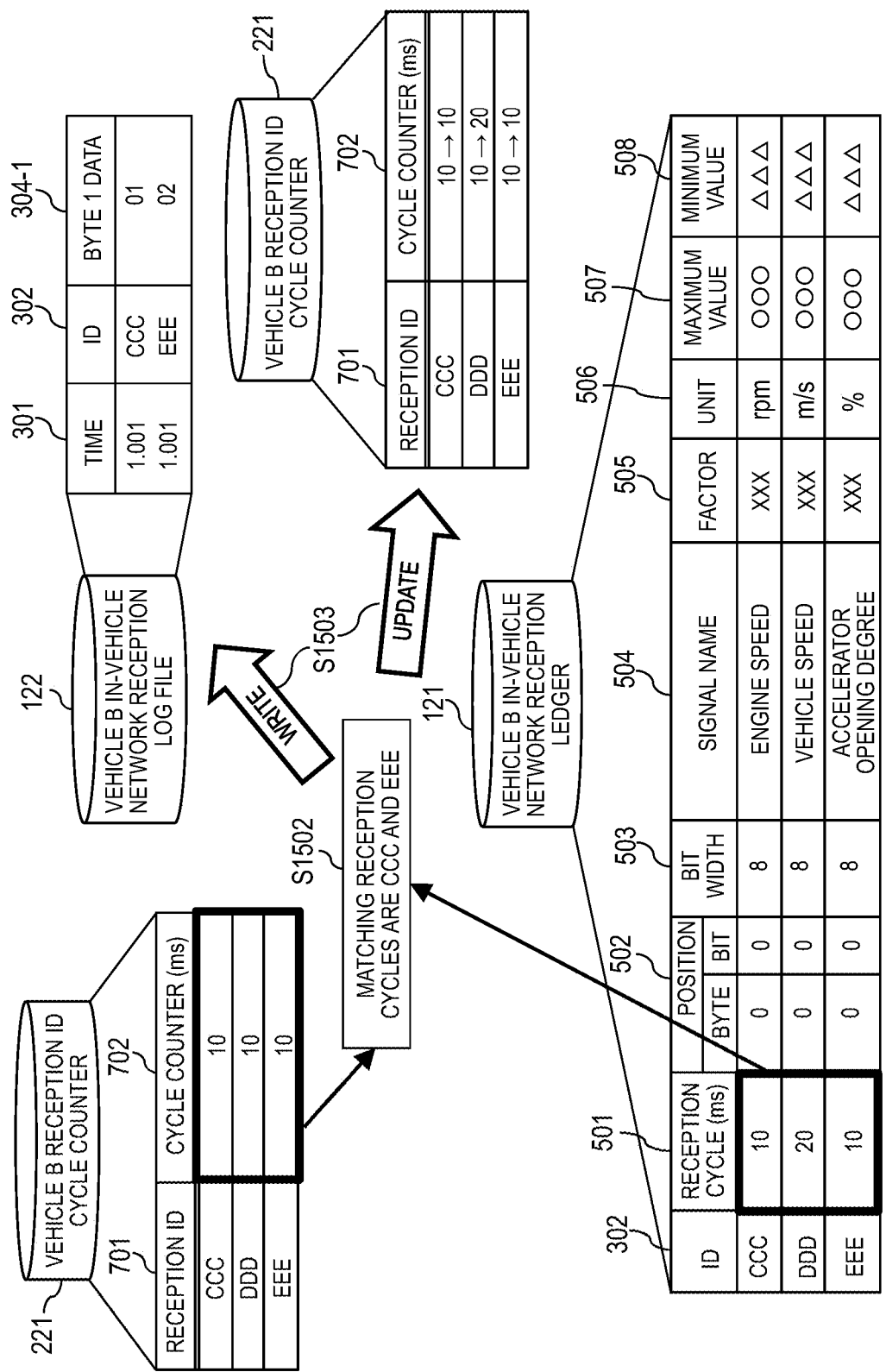
FIG. 17 is an explanatory diagram for illustrating Example 1 of updating the vehicle B reception ID cycle counter.

FIG. 17 is an explanatory diagram for illustrating Example 1 of updating the vehicle B reception ID cycle counter 221. The encoder 102 extracts values "10," "10," and "10" of the cycle counter 702 for values "CCC," "DDD," and "EEE" of the reception ID 701 in the vehicle B reception ID cycle counter 221. The encoder 102 determines whether combinations of the values of the reception ID 701 and the cycle counter 702 match combinations of the values of the ID 302 and the reception cycle 501 of the vehicle B in-vehicle network reception ledger 121, respectively.

In this case, a combination of the value "CCC" of the reception ID 701 and the value "10" of the cycle counter 702, and a combination of the value "EEE" of the reception ID 701 and the value "10" of the cycle counter 702 match the combinations of the values of the ID 302 and the reception cycle 501 of the vehicle B in-vehicle network reception ledger 121. Therefore, the encoder 102 writes the matching combinations in the vehicle B in-vehicle network reception log file 122 (Step S1502). As a result, the signals having diverse reception times can be converted at once at the minimum step time.

Further, the encoder 102 writes the matching combinations in association with "1.001" being the first transmission/reception time 301 in the period until the read time "1.011" in the vehicle B in-vehicle network reception log file 122 (Step S1502). As a result, the encoder 102 can record the vehicle B in-vehicle network reception logs in chronological order.

Still further, the encoder 102 overwrites the values of the cycle counters 702 of the vehicle B reception ID cycle counter 221 having the IDs 302 written in the vehicle B in-vehicle network reception log file 122 in Step S1502 as the reception IDs 701 with the minimum step time. The values of the IDs 302 written in the vehicle B in-vehicle network reception log file 122 in Step S1502 are "CCC" and "EEE."

The encoder 102 overwrites, in the vehicle B reception ID cycle counter 221, the value "10" of the cycle counters 702 of the entries for which the reception IDs 701 have the values of "CCC" and "EEE" with "10" (ms) being the minimum step time. As a result, the value of the cycle counters 702 of the entries for which the reception IDs 701 have the values of "CCC" and "EEE" is updated from "10" to "10". As a result, the value of the cycle counters 702 of the entries for which the reception IDs 701 have the values of "CCC" and "EEE" can be maintained at "10".

Further, the encoder 102 updates a value of the cycle counter 702 of the vehicle B reception ID cycle counter 221 having, as the reception ID 701, the ID 302 that is not written in the vehicle B in-vehicle network reception log file 122 in Step S1502 by adding the minimum step time thereto. The value of the ID 302 that is not written in the vehicle B in-vehicle network reception log file 122 in Step S1502 is "DDD."

The encoder 102 updates, in the vehicle B reception ID cycle counter 221, the value "10" of the cycle counter 702 of the entry for which the reception ID 701 has the value "DDD" by adding "10" (ms) being the minimum step time to the value "10" of the cycle counter 702 (Step S1503). As a result, the value of the cycle counter 702 of the entry for which the reception ID 701 has the value "DDD" is updated from "10" to "20". As a result, the reception timings can be aligned as in the vehicle A in-vehicle network logs, and the reproducibility can be increased.

Returning to FIG. 15, the encoder 102 determines whether all logs in the vehicle A in-vehicle network reception log data 1000 have been processed (Step S1504). When not all logs in the vehicle A in-vehicle network reception log data 1000 are processed (Step S1504: No), the encoder 102 adds the minimum step time to the current read time to update the read time (Step S1505), and the process returns to Step S905 of FIG. 9.

For example, when the current read time is 1.011 s, the encoder 102 adds 10 ms being the minimum step time to update the read time to 1.021 s, and in Step S905, sequentially reads entries in the vehicle A in-vehicle network reception log data until the updated read time (Step S905). Specific Example 2 of Step S905 is illustrated in FIG. 18.

Figure 18:
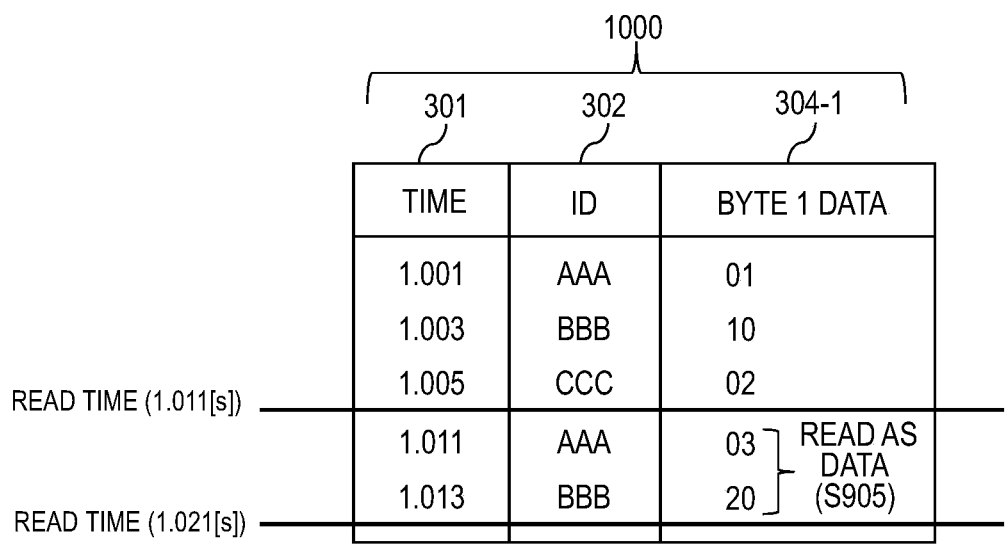
FIG. 18 is an explanatory diagram for illustrating Example 2 of reading the vehicle A in-vehicle network reception log data (Step S905).

FIG. 18 is an explanatory diagram for illustrating Example 2 of reading the vehicle A in-vehicle network reception log data (Step S905). The decoder 101 reads, from the vehicle A in-vehicle network reception log data 1000, entries found in a period from 1.011 s being the last time of the interval immediately before the update to 1.021 s being the updated read time (not including 1.021 s). In FIG. 18, entries for which the transmission/reception time 301 has values of "1.011" and "1.013" are read.

Figure 19:
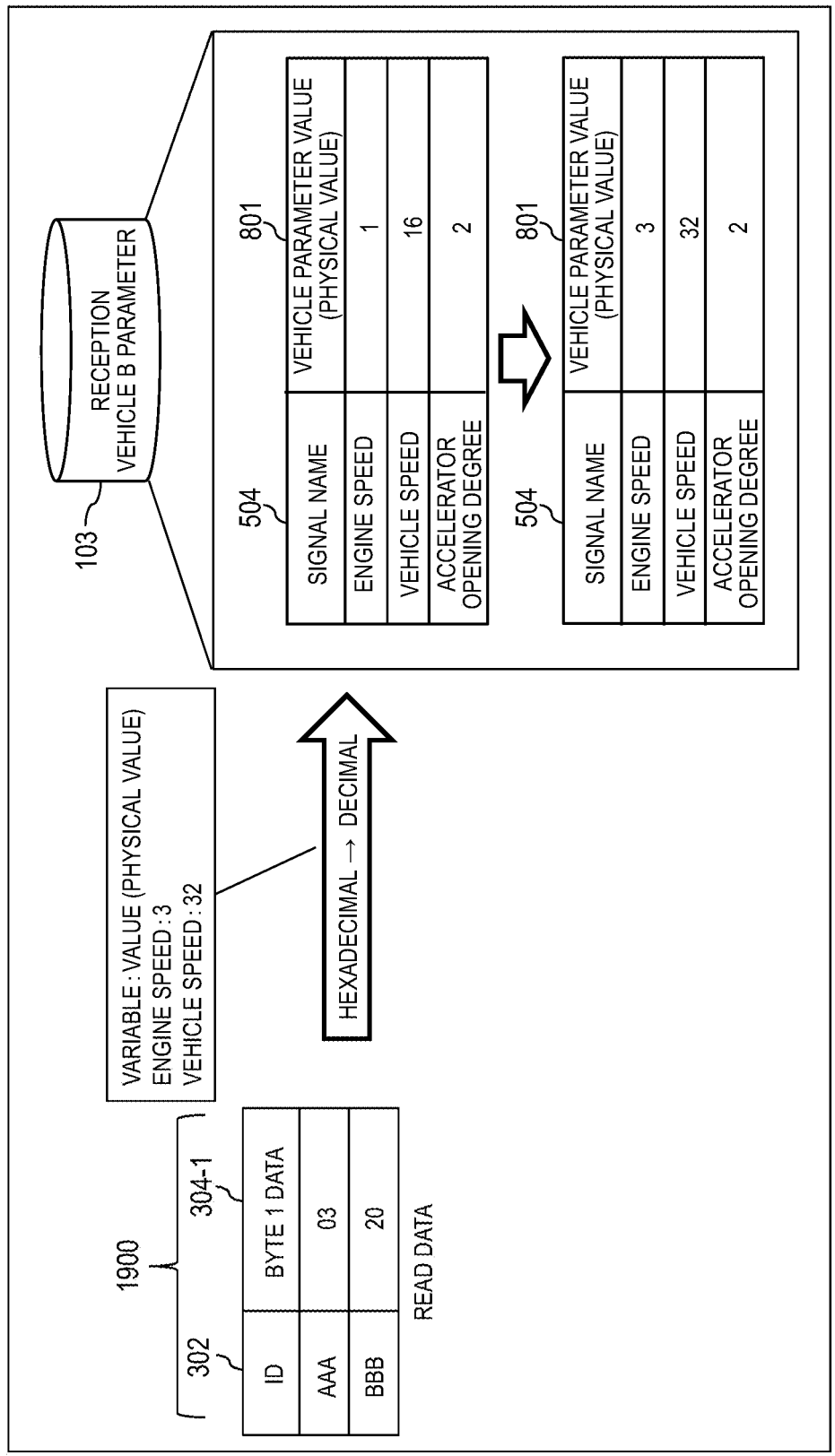
FIG. 19 is an explanatory diagram for illustrating Example 2 of updating the vehicle parameter value (Step S906).

FIG. 19 is an explanatory diagram for illustrating Example 2 of updating the vehicle parameter value 801 (Step S906). Read data 1900 is entries read in Step S905 illustrated in FIG. 18. The decoder 101 replaces the read data 1900, specifically, a value of the Byte 1 data 304-1 indicating the position 502 of Byte 1 of the read data 1900, by a variable of the corresponding signal name 504.

In this example, the signal name 504 corresponding to the entry (ID 302: AAA) in Row 1 of the read data 1900 is "engine speed," and hence a hexadecimal value "03" of the Byte 1 data 304-1 is converted into a decimal number and multiplied by the factor 505 (in this example, "1") to be replaced by a variable "3". Then, the decoder 101 updates, in the reception vehicle B parameter 103, "1" being the vehicle parameter value 801 of an entry having the same signal name 504 as "engine speed" being the signal name 504 of the replacement variable "3" to the replacement variable "3".

The signal name 504 corresponding to the entry (ID 302: BBB) in Row 2 of the read data 1900 is "vehicle speed," and hence a hexadecimal value "20" of the Byte 1 data 304-1 is converted into a decimal number and multiplied by the factor 505 (in this example, "1") to be replaced by a variable "32". Then, the decoder 101 updates, in the reception vehicle B parameter 103, "16" being the vehicle parameter value 801 of an entry having the same signal name 504 as "vehicle speed" being the signal name 504 of the replacement variable "32" to the replacement variable "32".

The read data 1900 does not include an ID 302 corresponding to "accelerator opening degree" being a value of the signal name 504, and hence the value "2" of the vehicle parameter value 801 for "accelerator opening degree" being the signal name 504 of the reception vehicle B parameter 103 is not updated. As a result, the updated reception vehicle B parameter 103 is output from the decoder 101 to the encoder 102, and the decoding process is ended.

When the reception vehicle B parameter 103 is input from the decoder 101, the encoder 102 starts the encoding process, and executes Step S1501 using the updated reception vehicle B parameter 103 of FIG. 19.

Figure 20:
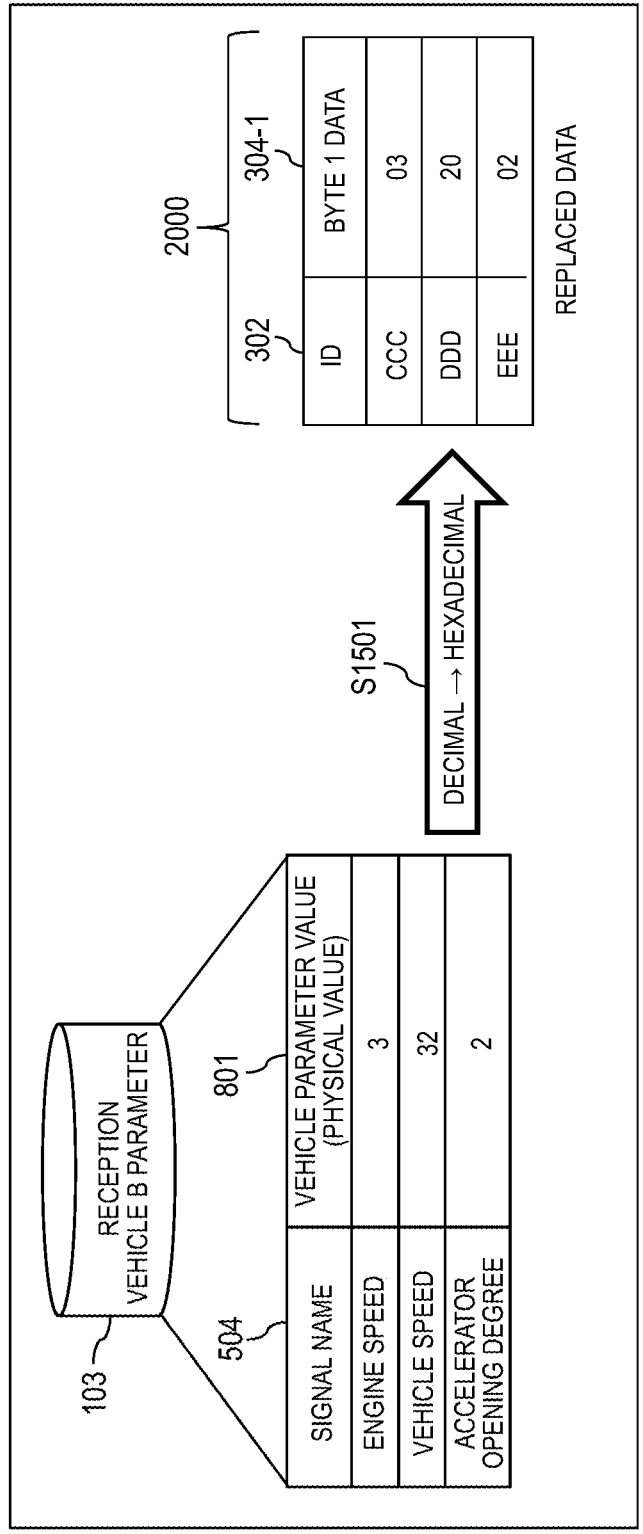
FIG. 20 is an explanatory diagram for illustrating Example 2 of generating the replaced data.

FIG. 20 is an explanatory diagram for illustrating Example 2 of generating the replaced data. The encoder 102 refers to the vehicle B in-vehicle network reception ledger 121 to determine a value of the ID 302 corresponding to a value of the signal name 504 of the reception vehicle B parameter 103. For example, a value of the ID 302 corresponding to the value "engine speed" of the signal name 504 is "CCC." A value of the ID 302 corresponding to the value "vehicle speed" of the signal name 504 is "DDD." A value of the ID 302 corresponding to the value "accelerator opening degree" of the signal name 504 is "EEE."

Further, the encoder 102 multiplies the vehicle parameter value 801 of the reception vehicle B parameter 103 by the factor 505 (in this example, "1"), then converts the resultant from a decimal number to a hexadecimal number, and associates the resultant having the ID 302 corresponding to the signal name 504 of the reception vehicle B parameter 103. For example, a value "3" of the vehicle parameter value 801 of the engine speed is replaced by a value "03" of the Byte 1 data 304-1 having the ID 302 of "CCC."

A value "32" of the vehicle parameter value 801 of the vehicle speed is replaced by a value "20" of the Byte 1 data 304-1 having the ID 302 of "DDD." A value "2" of the vehicle parameter value 801 of the accelerator opening degree is replaced by a value "02" of the Byte 1 data 304-1 having the ID 302 of "EEE." As a result, replaced data 2000 is generated.

Figure 21:
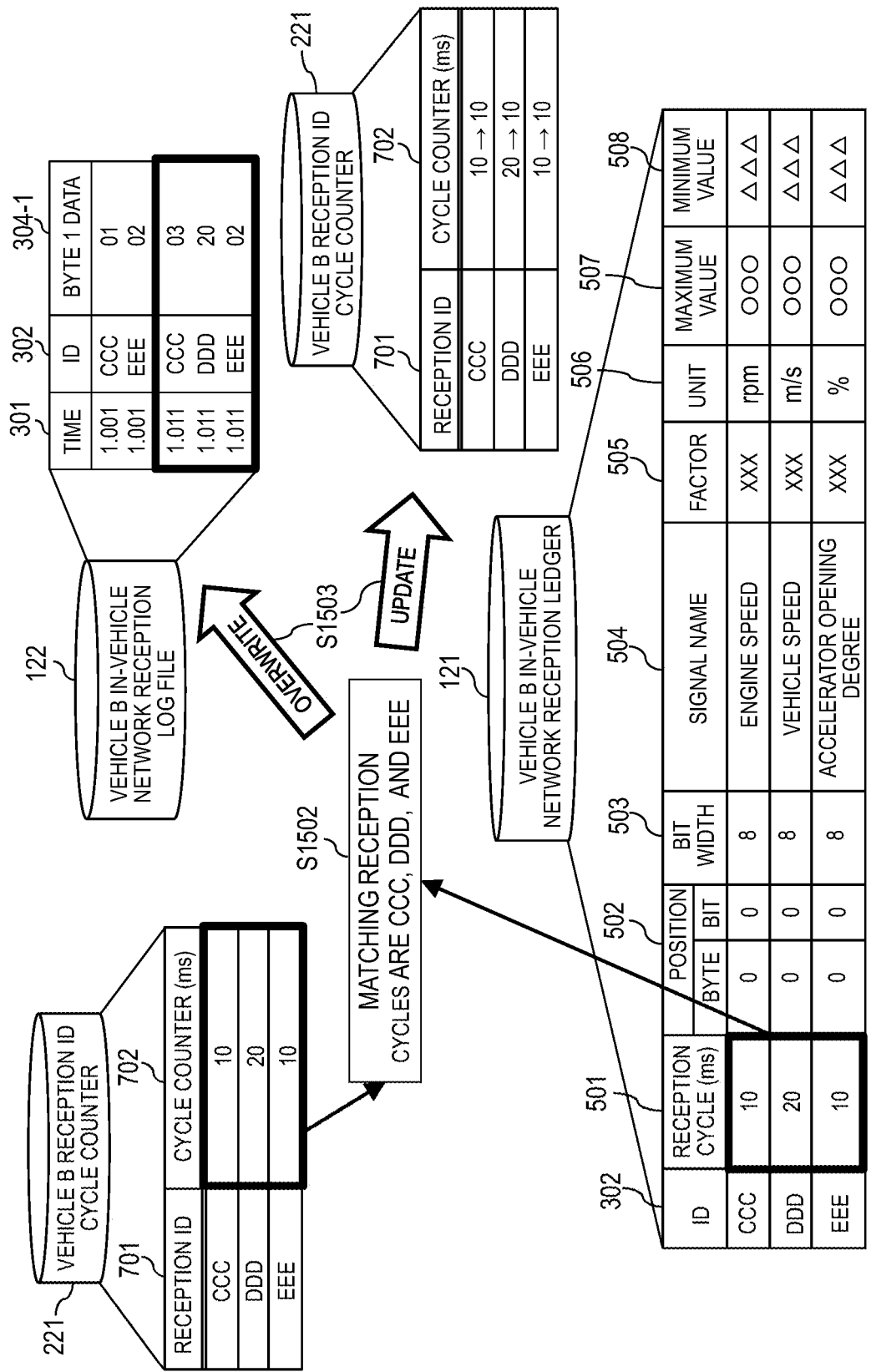
FIG. 21 is an explanatory diagram for illustrating Example 2 of updating the vehicle B reception ID cycle counter.

FIG. 21 is an explanatory diagram for illustrating Example 2 of updating the vehicle B reception ID cycle counter 221. The encoder 102 extracts values "10," "20," and "10" of the cycle counter 702 of values "CCC," "DDD," and "EEE" of the reception ID 701 in the vehicle B reception ID cycle counter 221.

The encoder 102 determines whether combinations of values of the reception ID 701 and the cycle counter 702 match combinations of values of the ID 302 and the reception cycle 501 of the vehicle B in-vehicle network reception ledger 121, respectively. In this case, all combinations match. Therefore, the encoder 102 writes the matching combinations in association with "1.011" being the first transmission/reception time 302 in a period until the most recent read time "1.021" in the vehicle B in-vehicle network reception log file 122 (Step S1502).

Further, the encoder 102 overwrites values of the cycle counter 702 of the vehicle B reception ID cycle counter 221 having the values of the ID 302 written in the vehicle B in-vehicle network reception log file 122 in Step S1502 as values of the reception ID 701 with the minimum step time. The values of the ID 302 written in the vehicle B in-vehicle network reception log file 122 in Step S1502 are "CCC," "DDD," and "EEE."

The encoder 102 overwrites, in the vehicle B reception ID cycle counter 221, the value "10" of the cycle counters 702 of the entries for which the reception IDs 701 have values of "CCC" and "EEE" with "10" (ms) being the minimum step time. As a result, the value of the cycle counters 702 of the entries for which the reception IDs 701 have the values of "CCC" and "EEE" is updated to "10". The value "20" of the cycle counter 702 of the entry for which the reception ID 701 has the value of "DDD" is overwritten with "10" (ms) being the minimum step time.

As a result, the value of the cycle counter 702 of the entry for which the reception ID 701 has the value of "DDD" is also updated to "10". Therefore, in processing of the next Step S1502, matching between the cycle counter 702 and the reception cycle 501 having the ID 302 of "DDD," that is, writing in Step S1503, can be avoided. Therefore, the reception timings can be aligned as in the vehicle A in-vehicle network logs, and the reproducibility can be increased.

As described above, according to the at least one embodiment, the data input to the ECUs of the vehicle A can be converted to input data adapted to the vehicle B by appropriately assigning values and positions of signals without obtaining the IDs of the ECUs in the vehicle A. Therefore, an in-vehicle network log of the data can be shared between the different vehicle types A and B with no need to obtain in-vehicle network logs for each of the vehicle types A and B, and the ECU development efficiency can be increased.

It should be noted that this disclosure is not limited to the above-mentioned embodiments, and encompasses various modification examples and the equivalent configurations within the scope of the appended claims without departing from the gist of this disclosure. For example, the above-mentioned embodiments are described in detail for a better understanding of this disclosure, and this disclosure is not necessarily limited to what includes all the configurations that have been described. Further, a part of the configurations according to a given embodiment may be replaced by the configurations according to another embodiment. Further, the configurations according to another embodiment may be added to the configurations according to a given embodiment. Further, a part of the configurations according to each embodiment may be added to, deleted from, or replaced by another configuration.

Further, a part or entirety of the respective configurations, functions, processing modules, processing means, and the like that have been described may be implemented by hardware, for example, may be designed as an integrated circuit, or may be implemented by software by a processor interpreting and executing programs for implementing the respective functions.

The information on the programs, tables, files, and the like for implementing the respective functions can be stored in a storage device such as a memory, a hard disk drive, or a solid state drive (SSD) or a recording medium such as an IC card, an SD card, or a DVD.

Further, control lines and information lines that are assumed to be necessary for the sake of description are described, but not all the control lines and information lines that are necessary in terms of implementation are described. It may be considered that almost all the components are connected to one another in actuality.

What is claimed is:

1. A conversion apparatus, comprising:
   a storage unit configured to store, for each control target to be controlled by computing units, definition information in which position information indicating a position of a value of a signal in data received by the computing units and a type of the signal are associated with each other for each piece of identification information of the computing units;
   a decoder configured to refer to, when first reception data received by first computing units, which control a first control target, is input, the definition information of the first control target to determine a type of a first signal at a first position in the first reception data, and output first input data in which the determined type of the first signal and a value of the first signal in the first reception data are associated with each other; and
   an encoder configured to refer to, when the first input data output from the decoder is input, the definition information of a second control target, which is different from the first control target, to output second input data in which a piece of identification information of second computing units that corresponds to the type of the first signal in the first input data, position information indicating a second position of the first signal in second reception data to be received by the second computing units, and a value of the first signal at the second position are associated with one another,
   wherein the decoder is configured to avoid outputting the first input data when, in the first reception data, the value of the first signal is associated with a piece of the identification information of the computing units that is not defined in the definition information of the first control target.

2. A conversion apparatus, comprising:
   a storage unit configured to store, for each control target to be controlled by computing units, definition information in which position information indicating a position of a value of a signal in data received by the computing units and a type of the signal are associated with each other for each piece of identification information of the computing units;
   a decoder configured to refer to, when first reception data received by first computing units, which control a first control target, is input, the definition information of the first control target to determine a type of a first signal at a first position in the first reception data, and output first input data in which the determined type of the first signal and a value of the first signal in the first reception data are associated with each other; and
   an encoder configured to refer to, when the first input data output from the decoder is input, the definition information of a second control target, which is different from the first control target, to output second input data in which a piece of identification information of second computing units that corresponds to the type of the first signal in the first input data, position information indicating a second position of the first signal in second reception data to be received by the second computing units, and a value of the first signal at the second position are associated with one another,
   wherein the definition information stores a reception cycle of the data for each piece of the identification information of the computing units,
   wherein the first reception data comprises a first reception time at the first computing units, and
   wherein the decoder is configured to refer to the definition information of the second control target to calculate a particular cycle, which is a common divisor of second reception cycles for each of the second computing units, obtain a particular piece of the first reception data based on the particular cycle and the first reception time, and output the first input data when the particular piece of the first reception data is obtained.

3. The conversion apparatus according to claim 2, wherein the decoder is configured to obtain the particular piece of the first reception data repeatedly at every particular cycle.

4. The conversion apparatus according to claim 2, wherein the decoder is configured to calculate a second reception time of the second reception data by the second computing units based on the first reception time and the particular cycle, and output the second input data in which the position information indicating the second position of the first signal, the value of the first signal at the second position, and the second reception time are associated with one another.

5. The conversion apparatus according to claim 4, further comprising a cycle counter configured to store the particular cycle as a counter value for each of the second computing units,
wherein the encoder is configured to overwrite, with the particular cycle, the counter value of some of the second computing units corresponding to the reception cycle that matches the particular cycle.

6. The conversion apparatus according to claim 4, further comprising a cycle counter configured to store the particular cycle as a counter value for each of the second computing units,
wherein the encoder is configured to add the particular cycle to the counter value of others of the second computing units corresponding to the reception cycle that does not match the particular cycle.

7. The conversion apparatus according to claim 2, wherein the encoder is configured to output the second input data in which identification information of some of the second computing units corresponding to the reception cycle that matches the particular cycle, the position information indicating the second position of the first signal in the second reception data to be received by the second computing units, and the value of the first signal at the second position are associated with one another.

8. A conversion method to be executed by a conversion apparatus configured to access a storage unit,
the storage unit having stored therein, for each control target to be controlled by computing units, definition information in which position information indicating a position of a value of a signal in data received by the computing units and a type of the signal are associated with each other for each piece of identification information of the computing units,
the conversion method comprising:
referring to, by the conversion apparatus, when first reception data received by first computing units, which control a first control target, is input, the definition information of the first control target to determine a type of a first signal at a first position in the first reception data, and outputting first input data in which the determined type of the first signal and a value of the first signal in the first reception data are associated with each other; and
referring to, by the conversion apparatus, when the first input data is input, the definition information of a second control target, which is different from the first control target, to output second input data in which a piece of identification information of second computing units that corresponds to the type of the first signal in the first input data, position information of a second position of the first signal in second reception data to be received by the second computing units, and a value of the first signal at the second position are associated with one another,
wherein the decoder is configured to avoid outputting the first input data when, in the first reception data, the value of the first signal is associated with a piece of the identification information of the computing units that is not defined in the definition information of the first control target.

9. A computer-readable recording medium having recorded thereon a conversion program to be executed by a processor configured to access a storage unit,
the storage unit having stored therein, for each control target to be controlled by computing units, definition information in which position information indicating a position of a value of a signal in data received by the computing units and a type of the signal are associated with each other for each piece of identification information of the computing units,
the conversion program causing the processor to:
refer to, when first reception data received by first computing units, which control a first control target, is input, the definition information of the first control target to determine a type of a first signal at a first position in the first reception data, and output first input data in which the determined type of the first signal and a value of the first signal in the first reception data are associated with each other; and
refer to, when the first input data is input, the definition information of a second control target, which is different from the first control target, to output second input data in which a piece of identification information of second computing units that corresponds to the type of the first signal in the first input data, position information indicating a second position of the first signal in second reception data to be received by the second computing units, and a value of the first signal at the second position are associated with one another,
wherein the decoder is configured to avoid outputting the first input data when, in the first reception data, the value of the first signal is associated with a piece of the identification information of the computing units that is not defined in the definition information of the first control target.

* * * * *